US012712694B2

(12) United States Patent
Ma et al.

(10) Patent No.: US 12,712,694 B2
(45) Date of Patent: Aug. 18, 2026

(54) FEEDBACK INFORMATION SENDING METHOD AND APPARATUS

(71) Applicant: HUAWEI TECHNOLOGIES CO., LTD., Shenzhen (CN)

(72) Inventors: Ruixiang Ma, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 558 days.

(21) Appl. No.: 17/959,863

(22) Filed: Oct. 4, 2022

(65) Prior Publication Data

US 2023/0028448 A1 Jan. 26, 2023

Related U.S. Application Data

(63) Continuation of application No. PCT/CN2021/086290, filed on Apr. 9, 2021.

(30) Foreign Application Priority Data

Apr. 10, 2020 (CN) ......................... 202010281669.8

(51) Int. Cl.
*H04L 5/00* (2006.01)
*H04L 1/1812* (2023.01)

(52) U.S. Cl.
CPC .......... *H04L 5/0055* (2013.01); *H04L 1/1812* (2013.01)

(58) Field of Classification Search
CPC ....... H04L 5/0055; H04L 5/0007; H04L 5/14; H04L 5/0094; H04L 1/1812; H04L 1/08;
(Continued)

(56) References Cited

U.S. PATENT DOCUMENTS 11,844,075 B2 * 12/2023 Yoon ..................... H04W 72/21
2019/0306923 A1 10/2019 Xiong et al.
(Continued)

FOREIGN PATENT DOCUMENTS

CN 108811094 A 11/2018
CN 109639398 A 4/2019
(Continued)

OTHER PUBLICATIONS

Lenovo et al., "Discussion of multi-TRP/panel transmission," 3GPP TSG RAN WG1 Meeting #98bis, R1-1910142, Chongqing, China, Oct. 14-18, 2019, 14 pages.
(Continued)

*Primary Examiner* — Yemane Mesfin
*Assistant Examiner* — Guoxing Fan
(74) *Attorney, Agent, or Firm* — Fish & Richardson P.C.

(57) ABSTRACT

Feedback information sending methods and apparatuses are provided in this disclosure. One method includes receiving, from a network device, M pieces of downlink control information (DCI) for scheduling transmissions of N pieces of data, the M pieces of DCI comprise first DCI and second DCI, determining, based on resource indication information in third DCI, a time-frequency resource for sending a hybrid automatic repeat request-acknowledgement (HARQ-ACK) codebook that comprises feedback information for N pieces of data corresponding to N pieces of DCI of the M pieces of DCI, and sending the HARQ-ACK codebook to the network device on the time-frequency resource.

11 Claims, 9 Drawing Sheets

(58) Field of Classification Search
CPC ... H04L 1/1854; H04L 1/1858; H04L 1/1861; H04L 1/1887; H04L 1/1896; H04W 72/0446; H04W 72/0453; H04W 72/21; H04W 72/23
See application file for complete search history.

(56) References Cited

U.S. PATENT DOCUMENTS

| | | | | |
|---|---|---|---|---|
| 2020/0100223 | A1* | 3/2020 | Park | H04L 5/10 |
| 2020/0107319 | A1* | 4/2020 | Bagheri | H04W 72/21 |
| 2021/0014029 | A1* | 1/2021 | Jiao | H04W 72/23 |
| 2021/0051652 | A1* | 2/2021 | Khoshnevisan | H04B 7/0417 |
| 2021/0258996 | A1* | 8/2021 | Xu | H04W 16/32 |
| 2022/0248436 | A1* | 8/2022 | Zhang | H04L 1/1854 |
| 2022/0279483 | A1* | 9/2022 | Gao | H04W 72/0446 |
| 2022/0294591 | A1* | 9/2022 | Liu | H04L 1/1864 |
| 2023/0047603 | A1* | 2/2023 | Kim | H04L 1/08 |
| 2023/0117189 | A1* | 4/2023 | Kim | H04L 1/0038 370/329 |

FOREIGN PATENT DOCUMENTS

| | | | |
|---|---|---|---|
| CN | 110475359 | A | 11/2019 |
| CN | 110557231 | A | 12/2019 |
| CN | 110880963 | A | 3/2020 |
| CN | 110932825 | A | 3/2020 |
| CN | 112492647 | A | 3/2021 |
| WO | 2020027143 | A1 | 2/2020 |

OTHER PUBLICATIONS

LG Electronics, "Enhancements on multi-TRP/panel transmission," 3GPP TSG RAN WG1 Meeting #99, R1-1912269, Reno, USA, Nov. 18-22, 2019, 16 pages.

Extended European Search Report in European Appln No. 21784566.8, dated Jul. 11, 2023, 12 pages.

Vivo, "Discussion On Remaining Issues On Multi TRP Transmission," 3GPP TSG RAN WG1 #98bis, R1-1910229, Chongqing, China, Oct. 14-20, 2019, 15 pages.

ZTE, "Mode 1 Resource Allocation Schemes On Sidelink," 3GPP TSG RAN WG1 #99, R1-1912552, Reno, Nevada, US, Nov. 18-22, 2019, 9 pages.

Intel Corporation, "On Multi-TRP/Multi-Panel Transmission," 3GPP TSG RAN WG1 Meeting #98b, R1-1910668. Oct. 14-20, 2019, 15 pages.

Huawei et al., "Other Aspects For URLLC/IIOT Enhancements," 3GPP TSG RAN WG1 Meeting #98bis, R1-1910398, Chongqing, China, Oct. 14-20, 2019, 7 pages.

Qualcomm, "Remaining Issues on UCI Enhancements for URLLC," 3GPP TSG RAN WG1 #100, R1- 2000969, eMeeting, Feb. 24th-Mar. 6, 2020, 9 pages.

Office Action in Chinese Appln. No. 202010281669.8, dated Oct. 19, 2022, 6 pages (with English translation).

Office Action in Chinese Appln. No. 202010281669.8, dated Apr. 21, 2022, 21 pages (with English translation).

International Search Report and Written Opinion in International Appln. No. PCT/CN2021/086290, mailed on Jun. 30, 2021, 24 pages (with English translation).

3GPP TS 38.212 V16.1.0, "3rd Generation Partnership Project; Technical Specification Group Radio Access Network; NR; Multiplexing and channel coding (Release 16)," Mar. 2020, 146 pages.

3GPP TS 38.213 V16.1.0, "3rd Generation Partnership Project; Technical Specification Group Radio Access Network; NR; Physical layer procedures for control (Release 16)," Mar. 2020, 156 pages.

* cited by examiner

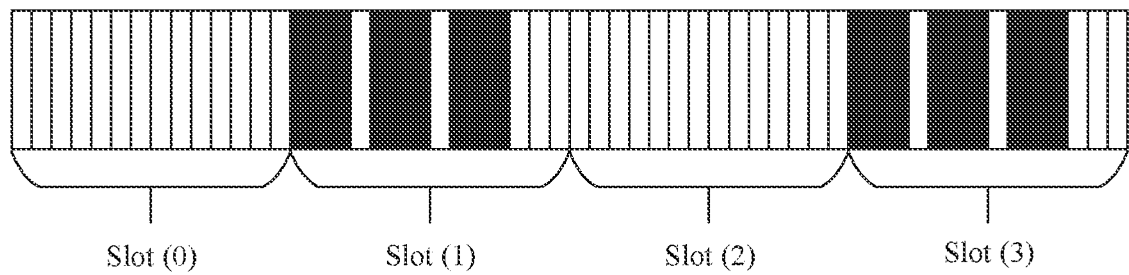

FIG. 4

Network device

Terminal device

S501: Send M pieces of DCI to the terminal device, where the M pieces of DCI are for scheduling N pieces of data, the M pieces of DCI include at least one of first DCI and second DCI, and the first DCI and the second DCI are two repetitions of a same piece of DCI, and are for scheduling a same piece of data in the N pieces of data S502: Receive the M pieces of DCI from the network device S503: Determine, based on resource indication information in third DCI, a time-frequency resource for sending a HARQ-ACK codebook, where the third DCI is a piece of DCI with a last time domain position in K pieces of DCI, the K pieces of DCI are a proper subset of the M pieces of DCI, and the HARQ-ACK codebook includes feedback information for each of the N pieces of data S504: Send the HARQ-ACK codebook to the network device on the determined time-frequency resource S505: Receive, on the time-frequency resource, the HARQ-ACK codebook sent by the terminal device

FIG. 5

FEEDBACK INFORMATION SENDING METHOD AND APPARATUS

CROSS-REFERENCE TO RELATED APPLICATIONS

This application is a continuation of International Application No. PCT/CN2021/086290, filed on Apr. 9, 2021, which claims priority to Chinese Patent Application No. 202010281669.8, filed on Apr. 10, 2020. The disclosures of the aforementioned applications are hereby incorporated by reference in their entireties.

TECHNICAL FIELD

This application relates to the field of wireless communication technologies, and in particular, to a feedback information sending method and an apparatus.

BACKGROUND

In a conventional technology, a terminal device may send, to a network device via one hybrid automatic repeat request-acknowledgement (HARQ-ACK) codebook, feedback information for downlink data scheduled by using a plurality of physical downlink control channels (PDCCHs). In addition, the terminal device may further determine, based on a physical uplink control channel resource indication (PRI) field in downlink control information (DCI) carried on the last PDCCH in the plurality of PDCCHs, an uplink resource specifically for sending the HARQ-ACK codebook.

To ensure reliability of an ultra-reliable low-latency communication (URLLC) service and reduce a latency, the network device may repeat a PDCCH, to be specific, the network device may send a plurality of repeated PDCCHs, where the plurality of repeated PDCCHs carry same DCI, and values of PRI fields in all pieces of DCI are the same.

Consequently, when the terminal device determines the uplink resource for sending the HARQ-ACK codebook, if the last PDCCH in the plurality of PDCCHs for generating the, HARQ-ACK codebook is a repetition of a previous PDCCH, a size of the uplink resource determined based on the PRI field in the DCI carried on the last PDCCH may not match a quantity of bits included in the HARQ-ACK codebook that needs to be sent. A reason is as follows: A value of the PRI field in the DCI is obtained merely through duplication of a value of a PRI field in DCI carried on the previous PDCCH for scheduling same data; however, when the network device sends the previous PDCCH for scheduling the same data, all the feedback information that needs to be sent in the HARQ-ACK codebook may not be considered. Therefore, if the uplink resource determined by the terminal device is excessively large, a waste of the uplink resource is caused. On the contrary, if the uplink resource determined by the terminal device is excessively small, reliability of the feedback information cannot be ensured.

SUMMARY

Embodiments of this application provide a feedback information sending method and an apparatus, to determine a time-frequency resource for sending a HARQ-ACK codebook, so that a size of the time-frequency resource matches a quantity of bits of feedback information included in the HARQ-ACK codebook, to improve resource utilization and enhance reliability of the feedback information.

According to a first aspect, an embodiment of this application provides a feedback information sending method. The method may be performed by a terminal device, or may be performed by a component (for example, a chip or a circuit) configured in the terminal device. The method may include: The terminal device receives M pieces of DCI from a network device, where the M pieces of DCI are for scheduling N pieces of data, the M pieces of DCI include at least one of first DCI and second DCI, the first DCI and the second DCI are two repetitions of a same piece of DCI, and the first DCI and the second DCI are for scheduling a same piece of data in the N pieces of data, where M is an integer greater than or equal to 2, and N is an integer less than or equal to M and greater than or equal to 2. The terminal device determines, based on resource indication information in third DCI, a time-frequency resource for sending a HARQ-ACK codebook, where the third DCI is a piece of DCI with a last time domain position in K pieces of DCI, the K pieces of DCI are a proper subset of the M pieces of DCI, and the HARQ-ACK codebook includes feedback information for each of the N pieces of data, where K is a positive integer. The terminal device sends the HARQ-ACK codebook to the network device on the determined time-frequency resource.

In this embodiment of this application, the terminal device may determine, based on the indication information in the third DCI with the last time domain position in the K pieces of DCI, the time-frequency resource for sending the HARQ-ACK codebook. The K pieces of DCI are the proper subset of the M pieces of DCI, for example, may include only DCI transmitted for the first time in the M pieces of DCI. In this way, a size of the determined time-frequency resource can match a quantity of bits of the feedback information included in the HARQ-ACK codebook that needs to be sent, thereby effectively improving resource utilization and enhancing reliability of the feedback information.

In a possible design of the first aspect, the K pieces of DCI are for scheduling K pieces of data in the N pieces of data, an $i^{th}$ piece of DCI in the K pieces of DCI is for scheduling data #i in the K pieces of data, and the $i^{th}$ piece of DCI is the first piece of DCI in DCI for scheduling the data #i, where i is a positive integer less than or equal to K.

In this embodiment of this application, each piece of DCI in the K pieces of DCI is DCI with an earliest time domain position in DCI for scheduling data that is scheduled by using the piece of DCI. In other words, the K pieces of DCI are all DCI transmitted for the first time instead of repetitions of other DCI. In this way, resource indication information in each of the K pieces of DCI may be dynamically adjusted by the network device according to a scheduling policy, to effectively improve accuracy and flexibility of indicating, by the network device, the resource for sending the HARQ-ACK codebook.

In a possible design of the first aspect, if there are a plurality of pieces of DCI with the last time domain position in the K pieces of DCI, the third DCI may be a piece of DCI with a highest frequency domain position in the DCI with the last time domain position in the K pieces of DCI, the third DCI may be a piece of DCI, corresponding to a cell with a largest identifier, in the DCI with the last time domain position in the K pieces of DCI, the third DCI may be a piece of DCI, corresponding to a cell with a largest identifier and located in a CORESET with a largest identifier, in the DCI with the last time domain position in the K pieces of DCI, or the third DCI may be a piece of DCI, corresponding to a cell with a largest identifier and located in a CORESET group with a largest identifier, in the DCI with the last time domain position in the K pieces of DCI.

In a possible design of the first aspect, that the K pieces of DCI are a proper subset of the M pieces of DCI may include: The M pieces of DCI include fourth DCI, and the fourth DCI is not included in the K pieces of DCI, where the fourth DCI may be a repetition of one of the K pieces of DCI; or the fourth DCI may be a repetition of fifth DCI, and the fifth DCI is a piece of DCI received from the network device other than the M pieces of DCI.

This embodiment of this application may be applied to a scenario with DCI repetition. To be specific, at least one piece of DCI in the M pieces of DCI is a repetition of another piece of DCI whose time domain position is before a time domain position of the piece of DCI, and the another piece of DCI may be a piece of DCI in the K pieces of DCI, or may be DCI other than the M pieces of DCI.

In a possible design of the first aspect, the method further includes: The terminal device determines a first resource set based on a quantity of bits of the feedback information included in the HARQ-ACK codebook, where the quantity of bits of the feedback information included in the HARQ-ACK codebook falls within a quantity-of-bits interval corresponding to the first resource set. Further, the terminal device may determine, in the first resource set based on the resource indication information in the third DCI, the time-frequency resource for sending the HARQ-ACK codebook. The resource indication information may be, for example, PRI indication information in a PRI field in the DCI.

In this embodiment of this application, when determining the time-frequency resource for sending the HARQ-ACK codebook, the terminal device may first determine the first resource set based on the quantity of bits included in the HARQ-ACK codebook, and then determine, in the determined resource set based on the PRI indication information in the third DCI, the time-frequency resource to be specifically used. In this way, the size of the determined time-frequency resource can match the quantity of bits in the HARQ-ACK codebook that needs to be sent, thereby effectively improving the resource utilization.

In a possible design of the first aspect, the M pieces of DCI are carried in L CORESET groups, where L is an integer greater than or equal to 2. The method further includes: The terminal device receives first indication information from the network device, where the first indication information indicates to jointly feed back the feedback information corresponding to the L CORESET groups. In this scenario, the HARQ-ACK codebook is a HARQ-ACK codebook jointly fed back by using the L CORESET groups.

In a possible design of the first aspect, the M pieces of DCI are carried in a same CORESET group, and the HARQ-ACK codebook is a HARQ-ACK codebook corresponding to the CORESET group. Alternatively, each of the M pieces of DCI indicates to send feedback information for scheduled data in a first time unit, and the HARQ-ACK codebook is a HARQ-ACK codebook corresponding to the first time unit.

In this embodiment of this application, the M pieces of DCI are specifically DCI for scheduling data corresponding to feedback information to be sent in the same HARQ-ACK codebook. There may be a plurality of possible implementations of sending, in the same HARQ-ACK, codebook, the feedback information for the data scheduled by using the M pieces of DCI, to improve applicability of this method.

According to a second aspect, an embodiment of this application provides a feedback information sending method. The method may be performed by a network device, or may be performed by a component (for example, a chip or a circuit) configured in the network device. The method may include: The network device sends M pieces of DCI to a terminal device, where the M pieces of DCI are for scheduling N pieces of data, the M pieces of DCI include at least one of first DCI and second DCI, the first DCI and the second DCI are two repetitions of a same piece of DCI, and the first DCI and the second DCI are for scheduling a same piece of data in the N pieces of data, where M is an integer greater than or equal to 2, and N is an integer less than or equal to M and greater than or equal to 2; and the M pieces of DCI further include third DCI, resource indication information in the third DCI indicates a time-frequency resource for a hybrid automatic repeat request-acknowledgement HARQ-ACK codebook, the HARQ-ACK codebook includes feedback information for each of the N pieces of data, the third DCI is a piece of DCI with a last time domain position in K pieces of DCI, and the K pieces of DCI are a proper subset of the M pieces of DCI, where K is a positive integer. The network device receives the HARQ-ACK codebook from the terminal device on the determined time-frequency resource.

In this embodiment of this application, the network device may determine, based on the resource indication information in the third DCI with the last time domain position in the K pieces of DCI, the time-frequency resource for receiving the HARQ-ACK codebook. This is similar to a case on a terminal device side. The K pieces of DCI are the proper subset of the Ni pieces of DCI, for example, may include only DCI transmitted for the first time in the NI pieces of DCI. In this way, a size of the determined time-frequency resource can match a quantity of bits of the feedback information included in the to-be-received HARQ-ACK codebook, to effectively improve resource utilization and enhance reliability of the feedback information.

In a possible design of the second aspect, the K pieces of DCI are for scheduling K pieces of data in the N pieces of data, an piece of DCI in the K pieces of DCI is for scheduling data #i in the K pieces of data, and the $i^{th}$ piece of DCI is the first piece of DCI in DCI for scheduling the data #i, where i is a positive integer less than or equal to K.

In a possible design of the second aspect, if there are a plurality of pieces of DCI with the last time domain position in the K pieces of DCI, the third DCI may be a piece of DCI with a highest frequency domain position in the DCI with the last time domain position in the K pieces of DCI, the third DCI may be a piece of DCI, corresponding to a cell with a largest identifier, in the DCI with the last time domain position in the K pieces of DCI, the third DCI may be a piece of DCI, corresponding to a cell with a largest identifier and located in a CORESET with a largest identifier, in the DCII with the last time domain position in the K pieces of DCI, or the third DCI may be a piece of DCI, corresponding to a cell with a largest identifier and located in a CORESET group with a largest identifier, in the DCI with the last time domain position in the K pieces of DCI.

In a possible design of the second aspect, that the K pieces of DCI are a proper subset of the M pieces of DCI may include: The M pieces of DCI include fourth DCI, and the fourth DCI is not included in the K pieces of DCI, where the fourth DCI is a repetition of one of the K pieces of DCI; or the fourth DCI may be a repetition of fifth DCI, and the fifth DCI is a piece of DCI sent by the network device other than the M pieces of DCI.

In a possible design of the second aspect, the time-frequency resource is a time-frequency resource, in a first resource set, corresponding to the resource indication information in the third DCI, and a quantity of bits of the feedback information included in the HARQ-ACK codebook falls within a quantity-of-bits interval corresponding to the first resource set.

In a possible design of the second aspect, the M pieces of DCI are carried in L CORESET groups, where L is an integer greater than or equal to 2. The method further includes: The network device sends first indication information to the terminal device, where the first indication information indicates to jointly feed back the feedback information corresponding to the L CORESET groups. In this scenario, the HARQ-ACK codebook is a HARQ-ACK codebook jointly fed back by using the L CORESET groups.

In a possible design of the second aspect, the M pieces of DCI are carried in a same CORESET group, and the HARQ-ACK codebook is a HARQ-ACK codebook corresponding to the CORESET group. Alternatively, each of the M pieces of DCI indicates to send feedback information for scheduled data in a first time unit, and the HARQ-ACK codebook is a HARQ-ACK codebook corresponding to the first time unit.

For beneficial effects of the possible designs of the second aspect, refer to the corresponding descriptions on the terminal device side. Details are not described herein According to a third aspect, an embodiment of this application provides a feedback information sending method. The method may be performed by a terminal device, or may be performed by a component (for example, a chip or a circuit) configured in a terminal device. The method may include: The terminal device receives M pieces of DCI from a network device, where the M pieces of DCI are for scheduling N pieces of data, the M pieces of DCI include at least one of first DCI and second DCI, the first DCI and the second DCI are two repetitions of a same piece of DCI, the first DCI and the second DCI are for scheduling a same piece of data in the N pieces of data, and a value of a PRI field in the first DCI is different from a value of a PRI field in the second DCI, where M is an integer greater than or equal to 2, and N is an integer less than or equal to M and greater than or equal to 2. The terminal device determines, based on a value of a PRI field in third DCI, a time-frequency resource for sending a HARQ-ACK codebook, where the third DCI is a piece of DCI with a last time domain position in the M pieces of DCI. and the HARQ-ACK codebook includes feedback information for each of the N pieces of data The terminal device sends the HARQ-ACK codebook to the network device on the determined time-frequency resource.

In this embodiment of this application, values of PRI fields in two or more pieces of repeated DCI may be different. For one piece of DCI, regardless of whether the DCI is repeated DCI or DCI transmitted for the first time, a value of a PRI field in the DCI may be dynamically changed by the network device according to a scheduling policy. In this way, the terminal device determines, based on the value of the PRI field in the DCI with the last time domain position in the M pieces of DCI, the time-frequency resource for sending the HARQ-ACK codebook, so that a size of the determined time-frequency resource can match a quantity of bits of the feedback information included in the HARQ-ACK codebook that needs to be sent, thereby effectively improving resource utilization and enhancing reliability of the feedback information.

In a possible design of the third aspect, if there are a plurality of pieces of DCI with the last time domain position in the M pieces of DCI, the third DCI may be a piece of DCI with a highest frequency domain position in the DCI with the last time domain position in the M pieces of DCI, the third DCI may be a piece of DCI, corresponding to a cell with a largest identifier, in the DCI with the last time domain position in the M pieces of DCI, the third DCI may be a piece of DCI, corresponding to a cell with a largest identifier and located in a CORESET with a largest identifier, in the DCI with the last time domain position in the M pieces of DCI, or the third DCI may be a piece of DCI, corresponding to a cell with a largest identifier and located in a CORESET group with a largest identifier, in the DCI with the last time domain position in the M pieces of DCI.

In a possible design of the third aspect, the method further includes: The terminal device determines a first resource set based on a quantity of bits of the feedback information included in the HARQ-ACK codebook, where the quantity of bits of the feedback information included in the HARQ-ACK codebook falls within a quantity-of-bits interval corresponding to the first resource set. Further, the terminal device may determine, in the first resource set based on the value of the PRI field in the third DCI, the time-frequency resource for sending the HARQ-ACK codebook.

In this embodiment of this application, when determining the time-frequency resource for sending the HARQ-ACK codebook, the terminal device may first determine the first resource set based on the quantity of bits included in the HARQ-ACK codebook, and then determine, in the determined resource set based on PRI indication information in the third. DCI, the time-frequency resource to be specifically used. In this way, the size of the determined time-frequency resource can match the quantity of bits in the HARQ-ACK codebook that needs to be sent, thereby effectively improving the resource utilization.

In a possible design of the third aspect, the M pieces of DCI are carried in L CORESET groups, where L is an integer greater than or equal to 2. The method further includes: The terminal device receives first indication information from the network device, where the first indication information indicates to jointly feed back the feedback information corresponding to the L CORESET groups. In this scenario, the HARQ-ACK codebook is a HARQ-ACK codebook jointly fed back by using the L CORESET groups.

In a possible design of the third aspect, the M pieces of DCI are carried in a same CORESET group, and the HARQ-ACK codebook is a HARQ-ACK codebook corresponding to the CORESET group. Alternatively, each of the M pieces of DCI indicates to send feedback information for scheduled data in a first time unit, and the HARQ-ACK codebook is a HARQ-ACK codebook corresponding to the first time unit.

In this embodiment of this application, the M pieces of DCI are specifically DCI for scheduling data corresponding to feedback information to be sent in the same HARQ-ACK codebook. There may be a plurality of possible implementations of sending, in the same HARQ-ACK codebook, the feedback information for the data scheduled by using the M pieces of DCI, to improve applicability of this method.

In a possible design of the third aspect, the method further includes: The terminal device combines and decodes bit fields other than PRI fields in DCI, in the M pieces of DCI, for scheduling same data, to improve the reliability of the feedback information.

According to a fourth aspect, an embodiment of this application provides a feedback information sending method. The method may be performed by a network device, or may be performed by a component (for example, a chip or a circuit) configured in a network device. The method may include: The network device sends M pieces of DCI to a terminal device, where the M pieces of DCI are for scheduling N pieces of data, the M pieces of DCI include at least one of first DCI and second DCI, the first DCI and the second DCI are two repetitions of a same piece of DCI, the first DCI and the second DCI are for scheduling a same piece of data in the N pieces of data, and a value of a PRI field in the first DCI is different from a value of a PRI field in the second DCI, where M is an integer greater than or equal to 2, and N is an integer less than or equal to M and greater than or equal to 2; and the M pieces of DCI further include third DCI, a value of a PRI field in the third DCI indicates a time-frequency resource for a hybrid automatic repeat request-acknowledgement HARQ-ACK codebook, the HARQ-ACK codebook includes feedback information for each of the N pieces of data, and the third DCI is a piece of DCI with a last time domain position in the M pieces of DCI. The network device receives the HARQ-ACK codebook from the terminal device on the time-frequency resource.

In this embodiment of this application, values of PRI fields in two or more pieces of repeated DCI may be different. For one piece of DCI, regardless of whether the DCI is repeated DCI or DCI transmitted for the first time, a value of a PRI field in the DCI may be dynamically changed by the network device according to a scheduling policy. In this way, the network device determines, based on the value of the PRI field in the DCI with the last time domain position in the M pieces of DCI, the time-frequency resource for receiving the HARQ-ACK codebook, so that a size of the determined time-frequency resource can match a quantity of bits of the feedback information included in the HARQ-ACK codebook that needs to be sent, thereby effectively improving resource utilization and enhancing reliability of the feedback information.

In a possible design of the fourth aspect, if there are a plurality of pieces of DCI with the last time domain position in the M pieces of DCI, the third DCI may be a piece of DCI with a highest frequency domain position in the DCI with the last time domain position in the M pieces of DCI, the third DCI may be a piece of DCI, corresponding to a cell with a largest identifier, in the DCI with the last time domain position in the M pieces of DCI, the third DCI may be a piece of DCI, corresponding to a cell with a largest identifier and located in a CORESET with a largest identifier, in the DCI with the last time domain position in the M pieces of DCI, or the third DCI may be a piece of DCI, corresponding to a cell with a largest identifier and located in a CORESET group with a largest identifier, in the DCI with the last time domain position in the M pieces of DCI.

In a possible design of the fourth aspect, the method further includes: The network device determines a first resource set based on a quantity of bits of the feedback information included in the HARQ-ACK codebook, where the quantity of bits of the feedback information included in the HARQ-ACK codebook falls within a quantity-of-bits interval corresponding to the first resource se. Further, the network device may determine, in the first resource set based on the value of the PRI field in the third DCI, the time-frequency resource for receiving a HARQ-ACK codebook.

In a possible design of the fourth aspect, the M pieces of DCI are carded in L CORESET groups, where L is an integer greater than or equal to 2. The method further includes: The network device sends first indication information to the terminal device, where the first indication information indicates to jointly feed back the feedback information corresponding to the L CORESET groups. In this scenario, the HARQ-ACK codebook is a HARQ-ACK codebook jointly fed back by using the L CORESET groups.

In a possible design of the fourth aspect, the M pieces of DCI are carried in a same CORESET group, and the HARQ-ACK codebook is a HARQ-ACK codebook corresponding to the CORESET group. Alternatively, each of the M pieces of DCI indicates to send feedback information for scheduled data in a first time unit, and the HARQ-ACK codebook is a HARQ-ACK codebook corresponding to the first time unit. For beneficial effects of the possible designs of the fourth aspect, refer to the corresponding descriptions on a terminal device side. Details are not described herein again.

According to a fifth aspect, an embodiment of this application provides a. communication apparatus. The apparatus may have a function of implementing the terminal device according to any one of the first aspect or the possible designs of the first aspect, or have a function of implementing the terminal device according to any one of the third aspect or the possible designs of the third aspect. The apparatus may be a terminal device, or may be a chip included in the terminal device.

The apparatus has a function of implementing the network device according to any one of the second aspect or the possible designs of the second aspect, or has a function of implementing the network device according to any one of the fourth aspect or the possible designs of the fourth aspect. The apparatus may be a network device, or may be a chip included in the network device.

The function of the communication apparatus may be implemented by hardware, or may be implemented by hardware executing corresponding software. The hardware or the software includes one or more modules, units, or means corresponding to the function.

In a possible design, a structure of the apparatus includes a processing module and a transceiver module. The processing module is configured to support the apparatus to perform a corresponding function of the terminal device according to any one of the first aspect or the designs of the first aspect, a corresponding function of the network device according to any one of the second aspect or the designs of the second aspect, a corresponding function of the terminal device according to any one of the third aspect or the possible designs of the third aspect, or a corresponding function of the network device according to any one of the fourth aspect or the possible designs of the fourth aspect. The transceiver module is configured to support communication between the apparatus and another communication device. For example, when the apparatus is the terminal device, the apparatus may send a HARQ-ACK codebook to a network device. The communication apparatus may further include a storage module. The storage module is coupled to the processing module, and stores program instructions and data that are necessary for the apparatus. In an example, the processing module may be a processor, the transceiver module may be a transceiver, and the storage module may be a memory. The memory may be integrated with the processor, or may be separate from the processor. This is not limited in this application.

In another possible design, a structure of the apparatus includes a processor, and may further include a memory. The processor is coupled to the memory, and may be configured to execute computer program instructions stored in the memory, to enable the apparatus to perform the method according to any one of the first aspect or the possible designs of the first aspect, the method according to any one of the second aspect or the possible designs of the second aspect, the method according to any one of the third aspect or the possible designs of the third aspect, or the method according to any one of the fourth aspect or the possible designs of the fourth aspect. Optionally, the apparatus further includes a communication interface, and the processor is coupled to the communication interface. When the apparatus is the network device or the terminal device, the communication interface may be a transceiver or an input/output interface. When the apparatus is the chip included in the network device or the terminal device, the communication interface may be an input/output interface of the chip. Optionally, the transceiver may be a transceiver circuit, and the input/output interface may be an input/output circuit.

According to a sixth aspect, an embodiment of this application provides a chip system, including a processor, where the processor is coupled to a memory, and the memory is configured to store a program or instructions. When the program or the instructions is/are executed by the processor, the chip system is enabled to implement the method according to any one of the first aspect or the possible designs of the first aspect, the method according to any one of the second. aspect or the possible designs of the second aspect, the method according to any one of the third aspect or the possible designs of the third aspect, or the method according to any one of the fourth aspect or the possible designs of the fourth aspect.

Optionally, the chip system further includes an interface circuit, and the interface circuit is configured to receive code instructions, and send the code instructions to the processor.

Optionally, there may be one or more processors in the chip system, and the processor may be implemented by hardware or may be implemented by software. When the processor is implemented by hardware, the processor may be a logic circuit, an integrated circuit, or the like. When the processor is implemented by software, the processor may be a general-purpose processor, and is implemented by reading software code stored in the memory.

Optionally, there may also be one or more memories in the chip system. The memory may be integrated with the processor, or may be separate from the processor. This is not limited in this application. For example, the memory may be a non-transitory memory, for example, a read-only memory ROM. The memory and the processor may be integrated into a same chip, or may be separately configured on different chips. A type of the memory and a manner of configuring the memory and the processor are not specifically limited in this application.

According to a seventh aspect, an embodiment of this application provides a computer-readable storage medium, storing a computer program or instructions, When the computer program or the instructions is/are executed, a computer is enabled to perform the method according to any one of the first aspect or the possible designs of the first aspect the method according to any one of the second aspect or the possible designs of the second aspect the method according to any one of the third aspect or the possible designs of the third aspect, or the method according to any one of the fourth aspect or the possible designs of the fourth aspect.

According to an eighth aspect, an embodiment of this application provides a computer program product. When a computer reads and executes the computer program product, the computer is enabled to perform the method according to any one of the first aspect or the possible designs of the first aspect, the method according to any one of the second aspect or the possible designs of the second aspect, the method according to any one of the third aspect or the possible designs of the third aspect, or the method according to any one of the fourth aspect or the possible designs of the fourth aspect.

According to a ninth aspect, an embodiment of this application provides a communication system, The communication system includes the network device and at least one terminal device in the foregoing aspects.

BRIEF DESCRIPTION OF DRAWINGS

FIG. 4 is a schematic diagram of a control resource set CORESET according to an embodiment of this application;

FIG. 5 is a schematic flowchart of a feedback information sending method according to an embodiment of this application;

DESCRIPTION OF EMBODIMENTS

To make objectives, technical solutions, and advantages of embodiments of this application clearer, the following further describes embodiments of this application in detail with reference to accompanying drawings.

The technical solutions in embodiments of this application may be applied to various communication systems, for example, a long term evolution (LIE) system, an LIE frequency division duplex (FDD) system, an LTE time division duplex (TDD) system, a 5th generation (5G) mobile communication system, or a new radio (NR) system, or may be applied to a future communication system, another similar communication system, or the like.

Figure 1:
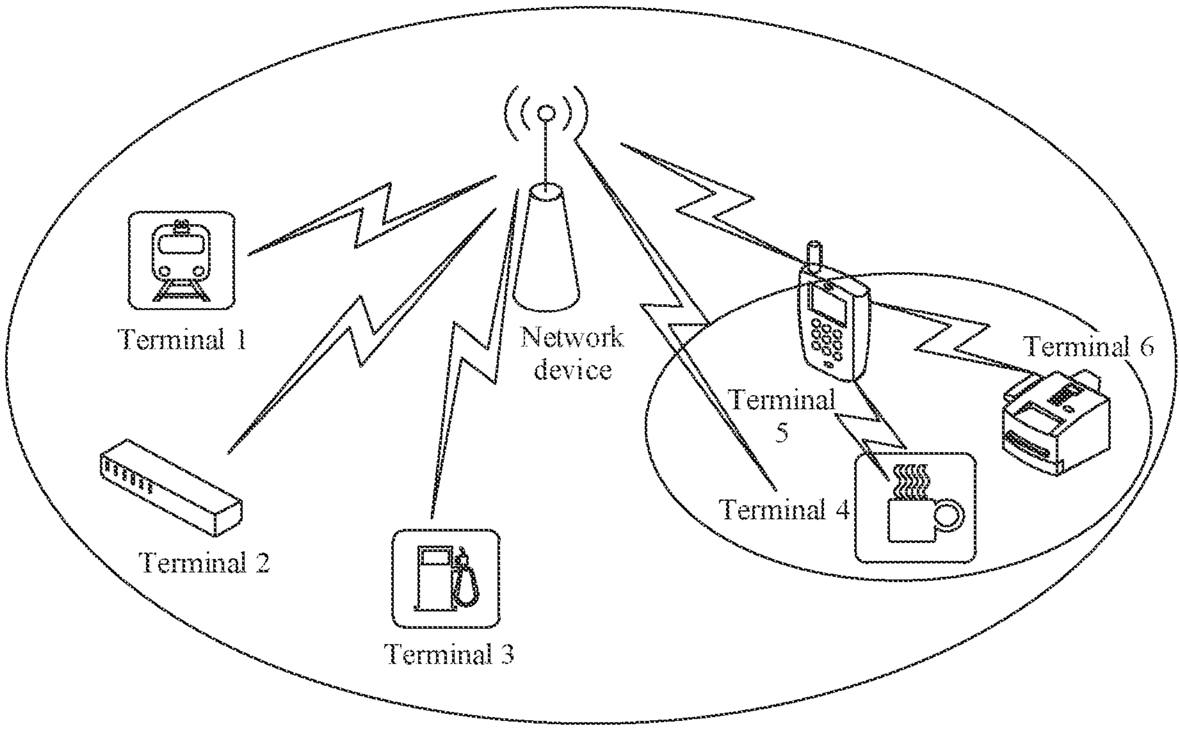
FIG. 1 is a schematic diagram of a structure of a communication system to which an embodiment of this application is applicable.

FIG. 1 is a schematic diagram of a structure of a communication system according to an embodiment of this application. The communication system includes a network device and at least one terminal device (for example, terminals 1 to 6 shown in FIG. 1). The network device may communicate with at least one terminal device (for example, the terminal device 1) through an uplink (UL) and a downlink (DL).

The network device in FIG. 1 may be an access network device, for example, a base station. The access network device corresponds to different devices in different systems, For example, the access network device may correspond to an eNB in a 4th generation (4G) mobile communication system, and corresponds to a 5G access network device, for example, a gNB, in a SG system. Certainly, the technical solutions provided in embodiments of this application may also be applied to a future mobile communication system. Therefore, the network device in FIG. 1 may also correspond to an access network device in the future mobile communication system.

It should be understood that there may be a plurality of network devices in the communication system, and one network device may serve a plurality of terminal devices. Quantities of network devices and terminal devices included in the communication system are not limited in this embodiment of this application. The network device and each of a part or all of the at least one terminal device in FIG. 1 may implement the technical solutions provided in embodiments of this application. In addition, various terminal devices shown in FIG. 1 are merely some examples of the terminal device. It should be understood that the terminal device in embodiments of this application is not limited thereto.

The following explains and describes some terms in embodiments of this application, to help a person skilled in the art have a better understanding.

(1) The terminal device is a device having a wireless transceiver function, and may be deployed on land, including an indoor or outdoor device, a handheld device, a wearable device, or a vehicle-mounted device, may be deployed on water (for example, on a ship), or may be deployed in air (for example, on an airplane, a balloon, and a satellite). The terminal device may communicate with a core network through a radio access network (RAN), and exchange a voice and/or data with the RAN. The terminal device may be a mobile phone, a tablet computer, a computer having a wireless transceiver function, a mobile Internet device, a wearable device, a virtual-reality terminal device, an augmented-reality terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in embodiments of this application. The terminal device may also be sometimes referred to as user equipment (UE), a mobile station, a remote station, and the like. A specific technology, a device form, and a name that are used by the terminal device are not limited in embodiments of this application.

By way of example and not limitation, the terminal device may alternatively be a wearable device in embodiments of this application. The wearable device may also be referred to as a wearable intelligent device, an intelligent wearable device, or the like, and is a general term of wearable devices such as glasses, gloves, watches, clothes, and shoes that are developed by applying wearable technologies to intelligent designs of daily wear. The wearable device is a portable device that is directly worn on the body or integrated into clothes or an accessory of a user. The wearable device is not only a hardware device, but also implements powerful functions through software support, data exchange, and cloud interaction. In a broad sense, the wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

The terminal device in embodiments of this application may alternatively be an in-vehicle module, a vehicle-mounted component, an automotive chip, or an on board unit that is built in a vehicle as one or more components or units. The vehicle may implement a method in this application through the in-vehicle module, the vehicle-mounted component, the automotive chip, or the on board unit that is built in the vehicle.

(2) The network device is also referred to as an access network device, and is a device that is in a network and that is configured to connect the terminal device to a wireless network. The network device may be a node in the radio access network, and may also be referred to as a base station and a RAN node (or device). The network device may be an evolved NodeB (eNodeB) in an LTE system or an LTE-advanced (LTE-A) system, may be a next generation NodeB (gNodeB) in a 5G NR system, may be a transmission reception point (TRP), a baseband unit (BBU), a Wi-Fi access point (AP), or the like, or may be a central unit (CU) and a distributed unit (DU). This is not limited in embodiments of this application. In a split deployment scenario in which the access network device includes the CU and the DU, the CU supports protocols such as the radio resource control (RRC) protocol, the packet data convergence protocol (PDCP), and the service data adaptation protocol (SDAP), and the DU mainly supports a radio link control (RIX) layer protocol, a media access control (MAC) layer protocol, and a physical layer protocol.

(3) it should be noted that terms “system” and “network” in embodiments of this application may be used interchangeably. The term “a plurality of” means two or more. in view of this, “a plurality of” may also be understood as “at least two” in embodiments of this application. The term “at least one” may be understood as one or more, for example, understood as one, two, or more. For example, “including at least one” means including one, two, or more, and does not limit which items are included. For example, if at least one of A, B, and C is included, A, B, C, A and B, A and C, B and C, or A, B, and C may be included. Similarly, understanding of descriptions such as “at least one type” is similar. The term “and/or” describes an association relationship between associated objects and represents that three relationships may exist. For example, A and/or B may represent the following three cases: Only A exists, both A and B exist, and only B exists. In addition, unless otherwise specified, the character “/” generally indicates an “or” relationship between associated objects.

Unless otherwise stated, ordinal numbers such as “first” and “second” in embodiments of this application are used to distinguish between a plurality of objects, but are not intended to limit a sequence, a time sequence, priorities, or importance of the plurality of objects. In addition, descriptions of “first” and “second” do not necessarily indicate that objects are different.

The following describes a process in which a terminal device sends feedback information in embodiments of this application.

Figure 2:
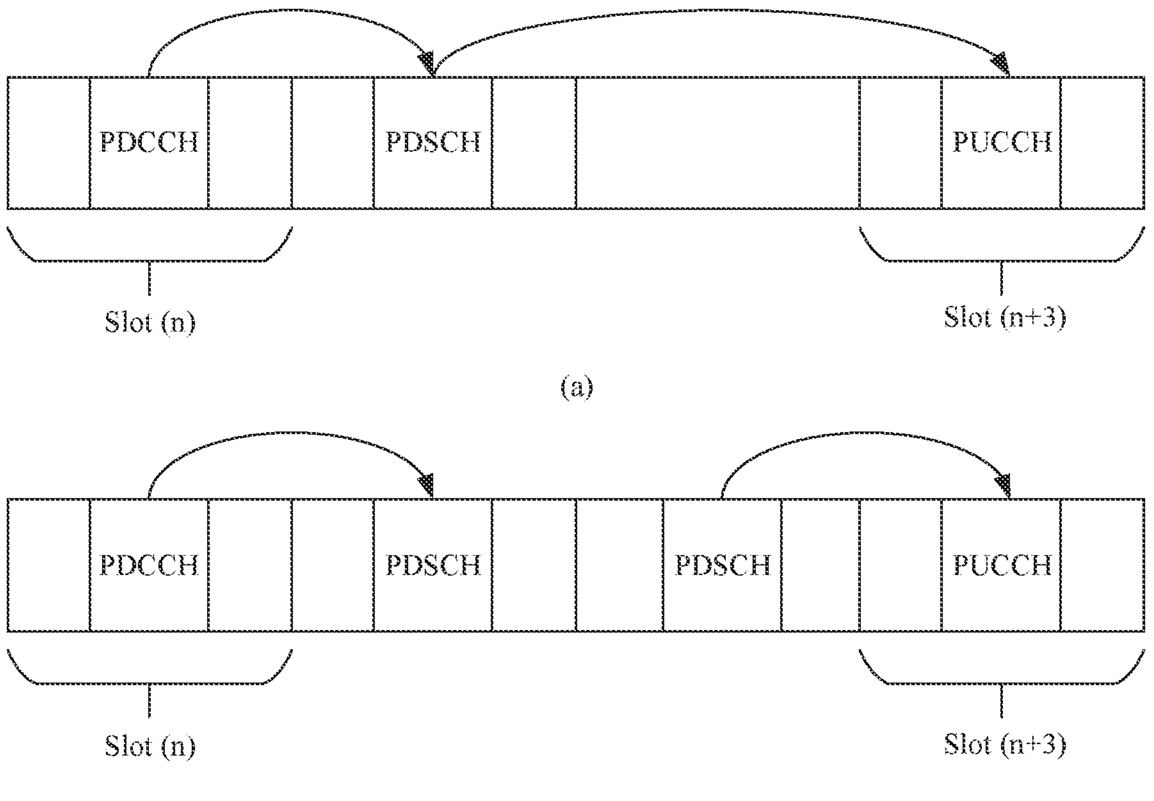
FIG. 2 is a schematic diagram of scheduling downlink data for a terminal device according to an embodiment of this application.

As shown in (a) in FIG. 2, a network device may send a PDCCH to the terminal device, where the PDCCH carries DCI. The PDCCH may be for scheduling a physical downlink shared channel (PDSCH) for the terminal device, where the PDSCH carries downlink data to be sent to the terminal device.

The terminal device may receive the DCI carried on the PDCCH, determine, based on time domain resource indication information in the DCI, a time unit in which the PDSCH is located and a specific time domain resource occupied by the PDSCH in the time unit, and further receive the downlink data carried on the PDSCH. The time domain resource indication information may indicate one row in a time domain resource table, and each row in the time domain resource table includes one piece of indication information K0 and one piece of start and length indicator value (SLIV) indication information. The indication information K0 indicates a quantity of time units between the time unit in which the PDSCH is located and a time unit in which the PDCCH is located, The SUN indication information indicates a start symbol and a length of the time domain resource specifically occupied by the PDSCH in the time unit in which the PDSCH is located. For example, assuming that the time unit is one slot, and a value of the indication information K0 is 1, if the time unit in which the PDCCH is located is a slot (n), the time unit in which the PDSCH is located is a slot (n+1). Further, if the SLIV indication information indicates that the PDSCH starts from the second symbol and has a length of two symbols, it indicates that the PDSCH occupies the second symbol and the third symbol in the slot (n+1).

In embodiments of this application, the time unit may be one slot, or may be one sub-slot. This is not specifically limited. In a case of a normal cyclic prefix, one slot includes 14 symbols. In a case of an extended cyclic prefix, one slot includes 12 symbols. The sub-slot may include two symbols or seven symbols. The sub-slot may also be referred to as a mini-slot. A quantity of symbols included in one sub-slot is less than a quantity of symbols included in the slot. Specifically, the quantity of symbols included in one sub-slot may be indicated by higher layer signaling sent by the network device. After receiving the higher layer signaling, the terminal device may learn of the quantity of symbols included in one sub-slot. For example, the higher layer signaling may indicate that the quantity of symbols in the sub-slot is 2 or 7; may indicate, by indicating one slot as two symbols multiplied by 7, that one slot includes seven sub-slots and the quantity of symbols in each sub-slot is 2; or may indicate, by indicating one slot as seven symbols multiplied by 2, that one slot includes two sub-slots and the quantity of symbols in each sub-slot is 7. In embodiments of this application, a “slot” may be replaced with a “sub-slot”. In embodiments of this application, the symbol or a time domain symbol is an orthogonal frequency division multiplexing (OFDM) symbol.

After receiving the downlink data carried on the PDSCH, the terminal device may send the feedback information to the network device based on a data decoding result. The feedback information may be an acknowledgement (ACK) indicating that the data is successfully received, or may be a negative acknowledgement (HACK) indicating that the data fails to be received.

The terminal device may further determine, based on indication information K1 in the DCI, a time unit for sending the feedback information. The indication information K1 indicates a quantity of time units between the time unit for sending the feedback information by the terminal device and the time unit for receiving the PDSCH by the terminal device. This indicates that the time unit for receiving the downlink data by the terminal device and the time unit for sending the feedback information to the network device by the terminal device need to satisfy a timing relationship of n+K1. In other words, if the terminal device receives the PDSCH in a slot (n), the terminal device should. send the feedback information to the network device in a slot (n+K1). During specific implementation, the indication information K1 may indicate a value in a K1 set, and the K1 set may be configured by the network device by using higher layer signaling, or may be predefined. For example, assuming that the network device configures the K1 set as {1, 2, 3, 4, 5, 6, 7, 8}, and the indication information K1 in the DCI occupies three bits, if the indication information K1 indicates “001”, it may indicate that a value of K1 is 2.

In embodiments of this application, the higher layer signaling is signaling sent at a higher protocol layer. The higher protocol layer may include at least one protocol layer above a physical layer. Specifically, the higher protocol layer may include at least one of the following protocol layers: a MAC layer, an RLC layer, a PDCP layer, an RRC layer, and a non-access stratum (NAS).

Further, the network device may indicate a quantity of repetitions of the PDSCH by using higher layer signaling. To be specific, DCI carried on one PDCCH may be for scheduling a. plurality of repeated PDSCHs. In other words, one piece of DCI may be for scheduling a plurality of transmissions of one PDSCH. These repeated PDSCHs carry same downlink data to be sent to the terminal device. The terminal device may send the feedback information to the network device based on results of decoding the downlink data carried on the plurality of PDSCHs. To be specific, the plurality of repeated PDSCHs may correspond to a same piece of feedback information; and if the terminal device successfully decodes downlink data carried on one or more of the plurality of repeated PDSCHs, the terminal device may feed back an ACK to the network device; or if the terminal device fails to decode the downlink data carried on all the plurality of repeated PDSCHs, the terminal device may feed back a NACK to the network device.

As shown in (b) in FIG. 2, a plurality of repeated PDSCHs may occupy consecutive time units in time domain, each PDSCH appears only once in one time unit, and all the PDSCHs are located in same time domain positions in the time units. Correspondingly, a time unit in which the terminal device is to send the feedback information to a network device is determined based on the last PDSCH in the plurality of repeated PDSCHs. For example, assuming that a quantity of repetitions of the PDSCH is 2, and the PDSCH appears only once in one slot, if the terminal device receives a PDCCH in a slot (n), and DCI carried on the PDCCH indicates that a value of K0 is and a value of K1 is 1, the terminal device may receive the first PDSCH in a slot (n+1), receive the second PDSCH in a slot (n+2), and then send the feedback information to the network device in a slot (n+3).

Figure 3:
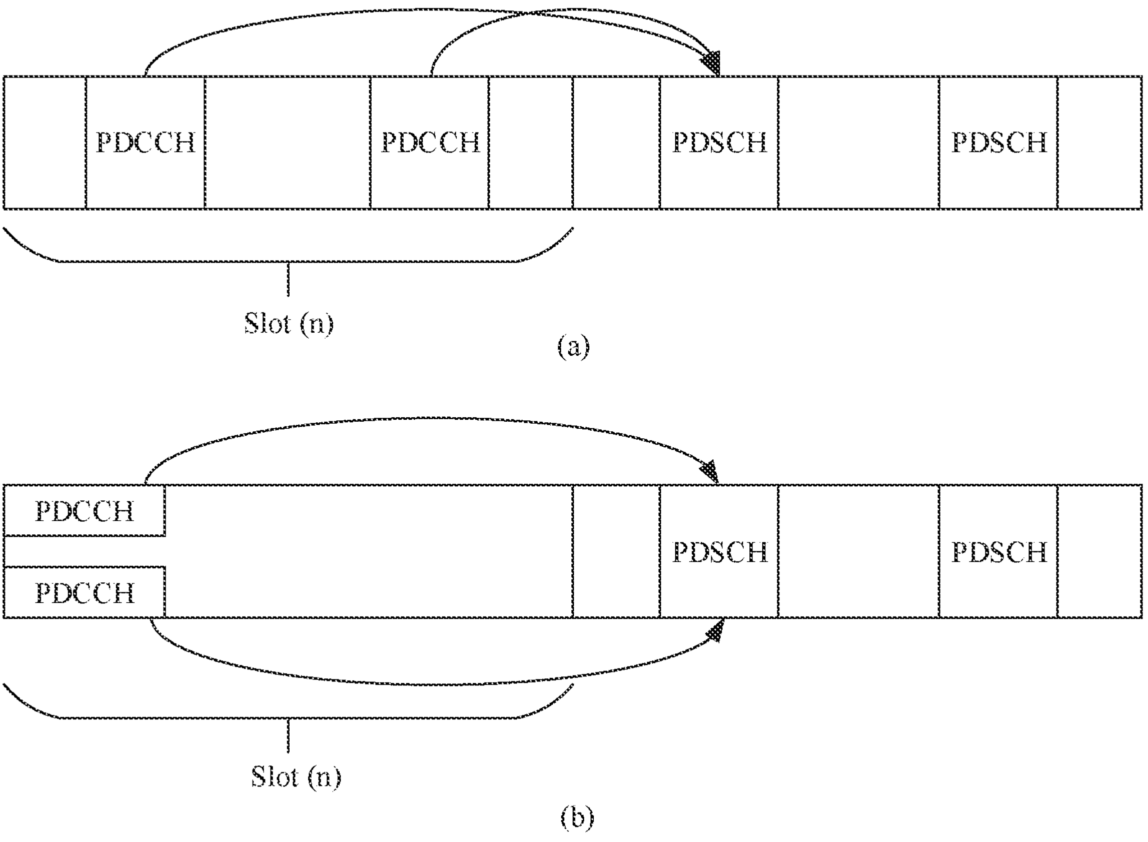
FIG. 3 is a schematic diagram of sending a plurality of repeated PDCCHs according to an embodiment of this application.

To ensure reliability of the PDCCH, the network device may repeatedly send a plurality of PDCCHs, and a plurality of pieces of DCI carried on the plurality of repeatedly sent PDCCHs may be for scheduling a same PDSCH or a plurality of repeated PDSCHs. The plurality of repeatedly sent PDCCHs may be repeated in time domain and/or frequency domain. Repetition in time domain may mean that the plurality of PDCCHs are repeated on different PDCCH monitoring occasions in time domain. Repetition in frequency domain may mean that the plurality of PDCCHs are repeated in different frequency domain resource positions in frequency domain. For example, in an example shown in (a) in FIG. 3, for two PDCCHs repeatedly sent by the network device on different PDCCH monitoring occasions in time domain, DCI carried on each PDCCH may be for scheduling two PDSCHs repeated in time domain. In an example shown in (b) in FIG. 3, for two PDCCHs repeatedly sent by the network device on different frequency domain resources in frequency domain, each PDCCH is for scheduling two PDSCHs repeated in time domain. In this application, scheduling a PDSCH by using a PDCCH is equivalent to scheduling the PDSCH by using DCI carried on the PDCCH.

Optionally, the plurality of repeatedly sent PDCCHs may belong to different control resource set (CORESET) groups.

During actual application, the terminal device does not send the feedback information one piece by one piece, but may generate a hybrid automatic repeat request-acknowledgement (HARQ-ACK) codebook by using a plurality of pieces of feedback information that need to be sent together, and then send the HARQ-ACK codebook to the network device. The HARQ-ACK codebook includes a group of consecutive bits obtained by concatenating ACKs or NACKs that need to be fed back in one time unit.

In other words, the terminal device may send, to the network device via one HARQ-ACK codebook, feedback information for data scheduled by using the plurality of PDCCHs. With reference to the content described above, it can be learned that there may be repeated PDCCHs in the plurality of PDCCHs indicating to send the feedback information for the scheduled data in the same HARQ-ACK codebook.

In this application, PDCCH repetition and DCI repetition have a same meaning. When a plurality of pieces of DCI are repeated, to be specific, when a plurality of pieces of DCI are for scheduling a same piece of data, all DCI other than the first piece of DCI may be considered as repetitions of the first piece of DCI, The first piece of DCI is a piece of DCI in the plurality of pieces of repeated DCI that meets one or more of the following conditions:

a piece of DCI with an earliest time domain position in the plurality of pieces of repeated DCI, namely, a piece of DCI corresponding to an earliest blind detection occasion; a piece of DCI with a highest frequency domain position in the plurality of pieces of repeated DCI; a piece of DCI corresponding to a smallest cell identifier in the plurality of pieces of repeated DCI; a piece of DCI located in a CORESET group with a smallest identifier in the plurality of pieces of repeated DCI; or a piece of DCI located in a CORESET group with a smallest identifier in the plurality of pieces of repeated DCI.

When one piece of DCI is for scheduling one piece of data, in other words, when there is no DCI repetition, the DCI is the first piece of DCI.

In embodiments of this application, a HARQ-ACK codebook may be carried on a physical uplink control channel (PUCCH), The terminal device may determine, based on a quantity of bits of feedback information included in the HARQ-ACK codebook and an indication in a PRI field in DCI carried on a PDCCH in a plurality of PDCCHs for generating the HARQ-ACK codebook, an uplink resource for sending the HARQ-ACK codebook.

The network device may send $X1^{th}$ indication information to the terminal device, where the $X1^{th}$ indication information indicates one or more CORESETs. For each CORESET, the $X1^{th}$ indication information may include the following information: an identifier of the CORESET, quantity (for example, optionally, 1, 2, or 3) of time domain symbols in the CORESET, a frequency domain resource position of the CORESET, and the like. The terminal device may determine the identifier of each of the plurality of CORESETs, the frequency domain resource position of each CORESET, and the quantity of time domain symbols in each CORESET based on the received $X1^{th}$ indication information.

The network device may further send $X2^{th}$ indication information to the terminal device, where the $X2^{th}$ indication information indicates one or more search spaces. For each search space, the $X2^{th}$ indication information may include at least one of the following information: an identifier of the search space, an identifier of a CORESET associated with the search space, and a periodicity, an offset, and a blind detection pattern of the search space in time domain. The periodicity may be, for example, two slots. The offset is a specific slot, for example, the second slot, in the periodicity. The pattern indicates specific positions, in the determined slot, in which blind detection is to be performed, where the specific positions may be specifically indicated by a 14-bit bitmap. For example, if the bitmap indicates 10101010101010, it means that PDCCH blind detection needs to be started in positions of the first, the third, the fifth, the seventh, the ninth, the eleventh, and the thirteenth symbols in a slot. These time domain positions are referred to as time domain start positions of the search space. The terminal device may determine the identifiers of the plurality of search spaces and time domain start positions of the plurality of search spaces based on the received $X2^{th}$ indication information. Because each search space is associated with one CORESET, if the time domain start position of the search space is determined, a start position of a time domain position of the CORESET is determined. The start position of the time domain position of the CORESET is the time domain start position of the search space associated with the CORESET. After the start position of the time domain position of the CORESET is determined, the time domain position of the CORESET may be determined with reference to a quantity of symbols of the CORESET. The time domain position of the CORESET may also be referred to as a PDCCH monitoring occasion.

For example, as shown in FIG. 4, a quantity of time domain symbols in a CORESET p is 3, and a configuration of a search space s is that a periodicity is two slots, an offset is the second slot, and a 14-bit bitmap is 10001000100000. Assuming that the search spaces is associated with the CORESET p, it may be determined that time domain start positions of the search space are the first, the fifth, and the ninth symbols in the second slot in every two slots. In this case, start positions of time domain positions of the CORESET p are the first, the fifth, and the ninth symbols in the second slot in every two slots. Because the quantity of symbols in the CORESET p is 3, the time domain positions of the CORESET are the first to the third symbols, the fifth to the seventh symbols, and the ninth to the eleventh symbols in the second slot in every two slots. For example, it may be determined that PDCCH monitoring occasions are in a slot (1) and a slot (3), each slot has three PDCCH monitoring occasions, and each PDCCH monitoring occasion has three symbols.

The terminal device may perform blind detection on the determined PDCCH monitoring occasion. After receiving a PDCCH, the terminal device may determine, based on a specific CORESET in a time-frequency position in which the PDCCH is received, namely, a specific CORESET in which the PDCCH is received, a specific CORESET in which the PDCCH is carried, to be specific, determine a specific CORESET in which DCI carried on the PDCCH is carried, in other words, determine a specific CORESET to which the PDCCH belongs, namely, a. specific CORESET to which DCI carried on the PDCCH belongs, From the other point of view, this may be equivalent to that the CORESET carries the PDCCH or the DCI.

The network device may send $X1^{th}$ indication information to the terminal device, where the $X1^{th}$ indication information indicates one or more CORESETs. For each CORESET, the $X1^{th}$ indication information may include the following information: a group identifier (denoted as CORESETGroupIndex) corresponding to a CORESET group to which the CORESET belongs. The CORESET group may also be referred to as a CORESET pool. Therefore, the group identifier corresponding to the CORESET group to which each CORESET belongs may also be referred to as a pool identifier (denoted as CORESETPoolIndex) of a CORESET pool to which each CORESET belongs. The terminal device receives the $X1^{th}$ indication information, and therefore determines the group identifier corresponding to the CORESET group to which each of the plurality of CORESETs belongs. A candidate value of the group identifier may be 0 to W−1, where W represents a quantity of CORESET groups, namely, a CORESET group 0 to a CORESET group W−1, and W is an integer greater than or equal to 2. One CORESET can belong to only one CORESET group, and one CORESET group may include a plurality of CORESETs.

For example, W=2; the network device indicates three CORESETs to the terminal device, and identifiers of the three CORESETs are respectively 1, 2, and 3; the three CORESETs are respectively denoted as a CORESET 1, a CORESET 2, and a CORESET 3, and group identifiers of the three CORESETs are respectively indicated as 0, 1, and 1. In other words, the CORESET 1 belongs to the CORESET group 0, and both the CORESET 2 and the CORESET 3 belong to the CORESET group 1. For any CORESET, if the $X1^{th}$ indication information does not include a group identifier corresponding to the CORESET, it is considered that the CORESET belongs to the CORESET group 0.

After the CORESET in which the PDCCH or the DCI is carried is determined above, a CORESET group in which the PDCCH or the DCI is carried may be determined based on a CORESET group to which the CORESET belongs.

Optionally, the plurality of pieces of DCI carried on the plurality of repeatedly sent PDCCHs may correspond to one or more HARQ-ACK codebooks.

Embodiment 1

FIG. 5 is a schematic diagram of a feedback information sending method according to an embodiment of this application. The method specifically includes the following steps.

Step S501: A network device sends M pieces of DCI to a terminal device, where the M pieces of DCI are for scheduling N pieces of data, M is an integer greater than or equal to 2, and N is an integer less than or equal to M and greater than or equal to 2.

In this embodiment of this application, that a network device sends M pieces of DCI to a terminal device may be understood as: The network device sends M PDCCHs to the terminal device, where each of the M PDCCHs carries one of the M pieces of DCI, each piece of DCI is for scheduling one PDSCH or a plurality of repeated PDSCHs, and the PDSCH carries one of the N pieces of data. It should be noted that when one piece of DCI is for scheduling a plurality of repeated PDSCHs, the plurality of repeated PDSCHs carry same data.

The M pieces of DCI are for scheduling the N pieces of data, and each of the M pieces of DCI is for scheduling one of the N pieces of data. It can be learned based on value ranges of M and N that when M is greater than N, that the M pieces of DCI are for scheduling N pieces of data indicates that there is a case in which two or more of the M pieces of DCI are for scheduling a same piece of data. In other words, there are pieces of repeated DCI in the M pieces of DCI, and these pieces of repeated DCI are for scheduling same data.

When M is equal to N, that the M pieces of DCI are for scheduling N pieces of data means that the M pieces of DCI are for scheduling M pieces of data. This indicates that each of the M pieces of DCI is for scheduling one of the M pieces of data, and there is no case in which two or more pieces of DCI are for scheduling a same piece of data. In other words, different DCI in the M pieces of DCI is for scheduling different data, and there is no repeated DCI in the M pieces of DCI.

The M pieces of DCI are specifically M pieces of DCI for scheduling data corresponding to feedback information to be sent in a same HARQ-ACK codebook. In other words, feedback information for the N pieces of data scheduled by using the M pieces of DCI is to be sent in a same HARQ-ACK codebook. Specifically, there may be the following plurality of possible implementations of sending, in the same HARQ-ACK codebook, the feedback information for the data scheduled by using the M pieces of DCI:

In a possible implementation, the M pieces of DCI are carried in L CORESET groups, where L is an integer greater than or equal to 2. Correspondingly, the network device may send. first indication information to the terminal device, where the first indication information indicates to jointly feed back the feedback information corresponding to the L CORESET groups.

The joint feedback means to jointly send, in the same HARQ-ACK codebook, the feedback information for data scheduled by using DCI received on PDCCH monitoring occasions in CORESETs included in the L CORESET groups. In other words, the L CORESET groups correspond to the same HARQ-ACK codebook, and the HARQ-ACK codebook is a HARQ-ACK codebook for the joint feedback. Correspondingly, when the M pieces of DCI indicate to feed back, in a same time unit, the data scheduled by using the M pieces of DCI, the terminal device may jointly feed back, in one HARQ-ACK codebook, the feedback information for the N pieces of data scheduled by using the M pieces of DCI.

In another possible implementation, the M pieces of DCI are carried in a same CORESET group, and the HARQ-ACK codebook is a HARQ-ACK codebook corresponding to the CORESET group. The terminal device may generate the corresponding HARQ-ACK codebook for the CORESET group that carries the M pieces of DCI.

As described above, one CORESET group may include one or more CORESETs. Therefore, that the M pieces of DCI are carried in a same CORESET group may mean that the M pieces of DCI are carried in one or more CORESETs included in the same CORESET group, in other words, that one or more CORESETs carrying the M pieces of DCI belong to the same CORESET group.

Further, a HARQ-ACK codebook corresponding to one CORESET group means: If feedback information for data scheduled by using DCI received on one or more PDCCH monitoring occasions in one or more CORESETs included in the CORESET group needs to be fed back in a same time unit, the feedback information is sent via a same HARQ-ACK codebook, where the HARQ-ACK codebook is the HARQ-ACK codebook corresponding to the CORESET group.

Optionally, the network device may send second indication information to the terminal device, where the second indication information indicates to separately feed back feedback information corresponding to different CORESET groups.

In still another possible implementation, all the M pieces of DCI indicate a same time unit for sending the feedback information for the scheduled data. For example, all the DCI indicates to send the feedback information for the scheduled data in a first time unit, where the time unit may be one slot or one sub-slot.

Because one HARQ-ACK codebook may be generated for feedback information that needs to be sent in a same time unit, the HARQ-ACK codebook may be a HARQ-ACK codebook corresponding to the first time unit. Correspondingly, the terminal device may generate the corresponding HARQ-ACK codebook for the first time unit.

Optionally, each piece of DCI may further include one piece of priority indication information, and the priority indication information indicates a priority of the feedback information for the data scheduled by using the DCI. In this case, the M pieces of DCI may alternatively be M pieces of DCI that indicate both a same time unit for sending the feedback information and a same priority of the feedback information. For example, each of the M pieces of DCI indicates to send the feedback information for the scheduled data in the first time unit, and indicates that the priority of the feedback information is a priority 0.

Because one HARQ-ACK codebook may be generated for feedback information that needs to be sent in a same time unit and that has a same priority, the HARQ-ACK codebook may be a HARQ-ACK codebook corresponding to the priority 0 in the first time unit, The terminal device generates the corresponding HARQ-ACK codebook for the first time unit and the priority 0.

Optionally, each piece of DCI may further include one piece of group identifier indication information, the group identifier indication information indicates a group identifier of the feedback information for the data scheduled by using the DCI, and the group identifier indicates a feedback group to which the feedback information for the data scheduled by using the DCI belongs. In this case, the M pieces of DCI may alternatively be M pieces of DCI that indicate both a same time unit for sending the feedback information and a same group identifier of the feedback information. For example, each of the M pieces of DCI indicates to send the feedback information for the scheduled data in the first time unit, and indicates that the group identifier of the feedback information is a group identifier 0.

Because one HARQ-ACK codebook may be generated for feedback information that needs to be sent in a same time unit and that has a same group identifier, the HARQ-ACK codebook may be a HARQ-ACK codebook corresponding to the group identifier 0 in the first time unit. The terminal device generates the corresponding HARQ-ACK codebook for the first time unit and the group identifier 0.

It should be noted that in this embodiment of this application, the network device may further send DCI other than the M pieces of DCI to the terminal device. However, it should be noted that the other DCI is not for generating the HARQ-ACK codebook. To be specific, if the other DCI is for scheduling data other than the N pieces of data, feedback information for the data scheduled by using the other DCI is not fed back in the HARQ-ACK codebook, and the terminal device may generate another HARQ-ACK codebook based on the other DCI. The another HARQ-ACK codebook is different from the foregoing HARQ-ACK codebook that includes the feedback information for the data scheduled by using the M pieces of DCI.

Further, because the M pieces of DCI are specifically the M pieces of DCI for scheduling the data corresponding to the feedback information to be fed back in the same HARQ-ACK codebook, when M is equal to N, that there is no repeated DCI in the M pieces of DCI does not mean that the other DCI sent by the network device to the terminal device is not repeated with a piece of DCI in the M pieces of DCI. In other words, the other DCI sent by the network device to the terminal device may be for scheduling same data as a piece of DCI in the M pieces of DCI.

For example, the M pieces of DCI may include at least one of first DCI and second DCI. The first DCI and the second DCI are two repetitions of a same piece of DCI, and are for scheduling a same piece of data in the N pieces of data. For example, both the first DCI and the second DCI may be for scheduling first data, and the first data is one of the N pieces of data.

If the M pieces of DCI include both the first DCI and the second DCI, it indicates that there is repeated DCI in the M pieces of DCI. This corresponds to the foregoing case in which M is greater than N. Specifically, it can be learned from the foregoing several possible implementations of the HARQ-ACK codebook that the first DCI and the second DCI may belong to different CORESET groups, but feedback information corresponding to the two CORESET groups needs to be jointly fed back; the first DCI and the second DCI may belong to a same CORESET group; or the first DCI and the second DCI may indicate a same time unit for sending feedback information.

It should be noted that, during specific implementation, the terminal device may generate feedback information for the first data based on only one of the first DCI and the second DCI. In this scenario, the HARQ-ACK codebook includes only one piece of feedback information for the first data. Correspondingly, the entire HARQ-ACK codebook includes N pieces of feedback information in total, and the N pieces of feedback information are in a one-to-one correspondence with the N pieces of data. For example, the feedback information for the first data is generated based on DCI in an earlier time domain position in the first DCI and the second DCI. If the DCI in the earlier time domain position is the first DCI, a location of the feedback information for the first data in the HARQ-ACK codebook is determined based on the first DCI.

Alternatively, the terminal device may separately generate feedback information for the first data based on the first DCI and the second DO. In this scenario, the HARQ-ACK codebook includes two pieces of feedback information for the first data, and the two pieces of feedback information for the first data may be understood as two copies of the feedback information for the first data. Correspondingly, the entire HARQ-ACK codebook includes M pieces of feedback information in total, and the M pieces of feedback information are in a one-to-one correspondence with the M pieces of DCI. A location of the feedback information for the first data in the HARQ-ACK codebook is determined based on the first DCI and the second DCI.

If the M pieces of DCI include only one of the first DCI and the second DCI, for example, include the first DCI but do not include the second DCI, it indicates that there is a piece of second DCI beyond the M pieces of DCI that is repeated with the first DCI.

Specifically, it can be learned from the foregoing several possible implementations of the HARQ-ACK codebook that the first DCI and the second DCI may belong to different CORESET groups, but feedback information corresponding to the two CORESET groups needs to be separately fed back. Therefore, feedback information for the data scheduled by using the second DCI may be fed back in a HARQ-ACK codebook corresponding to another CORESET group. Alternatively, the first DCI and the second DCI indicate different time units for sending feedback information. Therefore, the feedback information for the data scheduled by using the second DCI may be fed back in a HARQ-ACK codebook corresponding to another time unit. Alternatively, feedback information for the first data may be fed back only in a HARQ-ACK codebook corresponding to the first DCI. In this case, the first DCI may be DCI with an earliest time domain position in a plurality of pieces of DCI for scheduling the first data, may be DCI indicating an earliest time unit for sending feedback information in a plurality of pieces of DCI for scheduling the first data, may be DCI indicating a largest time-frequency resource for sending feedback information in a plurality of pieces of DCI for scheduling the first data, or may be DCI indicating a smallest time-frequency resource for sending feedback information in a plurality of pieces of DCI for scheduling the first data. Alternatively, the first DCI may be in other implementations, and the implementations are not enumerated one by one herein.

It may be understood that, based on the foregoing descriptions of the first piece of DCI in the plurality of pieces of DCI, if a time domain position of the second DCI is before a time domain position of the first DCI, it may indicate that the first DCI is not the first piece of DCI for scheduling the first data, to be specific, the first DCI is not DCI with an earliest time domain position in the plurality of pieces of DCI sent by the network device that are for scheduling the first data, in other words, the first DCI is not DCI transmitted for the first time.

Similarly, if a time domain position of the first DCI is before a time domain position of the second DCI, it may indicate that the second DCI is not the first piece of DCI for scheduling the first data, to be specific, the second DCI is not DCI with an earliest time domain position in the plurality of pieces of DCI sent by the network device that are for scheduling the first data, in other words, the second DCI is not DCI transmitted for the first time. However, it should be understood that in this case, the first DCI may be or may not be the first piece of DCI for scheduling the first data.

Optionally, the network device may further send third indication information to the terminal device, where the third indication information indicates a value of M and/or a value of N. Alternatively, a value of M and/or a value of N in this embodiment of this application may be predefined. "Predefine" may be understood as "define", "store", "pre-store", "pre-negotiate", "pre-configure", "solidify", or the like. Details are not described below.

Step S502: The terminal device receives the M pieces of DCI from the network device.

In this embodiment of this application, each of the M pieces of DCI may further indicate one or more time domain resource positions of the one or more scheduled PDSCHs. In this way, after receiving the M pieces of DCI, the terminal device may receive the N pieces of data in the time domain resource positions indicated by the M pieces of DCI.

Further, the terminal device may generate one HARQ-ACK codebook based on indications in downlink assignment index (DAI) fields in the M pieces of DCI and decoding results of the N pieces of data scheduled by using the M pieces of DCI. The HARQ-ACK codebook includes the feedback information for each of the N pieces of data. Specifically, if the terminal device successfully decodes a piece of data in the N pieces of data, feedback information corresponding to the data in the HARQ-ACK codebook is an ACK. If the terminal device fails to decode the data, the feedback information corresponding to the data in the HARQ-ACK codebook is a NACK.

As described above, the M pieces of DCI may include repeated DCI. If the M pieces of DCI include a plurality of pieces of repeated DCI, and the plurality of pieces of repeated DCI are for scheduling same data, in a possible implementation, the terminal device may generate, for the plurality of pieces of repeated DCI, one piece of feedback information for the scheduled data. For example, the feedback information for the scheduled data may be generated based on one of the plurality of pieces of repeated DCI. Correspondingly, the HARQ-ACK codebook includes one copy of the feedback information for the data scheduled by using the plurality of pieces of repeated DCI. A location of the copy in the HARQ-ACK codebook is determined based on the piece of DCI for generating the copy, and is specifically determined based on an indication in a DAL field in the piece of DCI for generating the copy. It can be learned that in this implementation, the entire HARQ-ACK codebook includes N pieces of feedback information in total. To be specific, the feedback information for each of the N pieces of data includes only one copy in the codebook.

Alternatively, in another possible implementation, the terminal device may separately generate, for each of the plurality of pieces of repeated DCI, one piece of feedback information for the scheduled data, Correspondingly, the HARQ-ACK codebook includes a plurality of copies of the feedback information for the data scheduled by using the plurality of pieces of repeated DCI, each copy corresponds to one of the plurality of pieces of repeated DCI, and locations of the plurality of copies in the HARQ-ACK codebook are determined based on the plurality of pieces of repeated DCI, to be specific, are determined based on indications in DAI fields in the plurality of pieces of repeated DCI. It can be learned that in this implementation, the entire HARQ-ACK codebook includes M pieces of feedback information in total. To be specific, a quantity of copies of the feedback information, in the HARQ-ACK codebook, for each of the N pieces of data is consistent with a quantity of pieces of DCI, in the M pieces of DCI, for scheduling the data.

Step S503: The terminal device determines, based on resource indication information in third DCI, a time-frequency resource for sending the HARQ-ACK codebook.

The resource indication information may be PRI indication information. The PRI indication information may be located in a PRI field in the DCI. Different values of the PRI field may represent different PRI indication information, and indicate different resources in one resource set.

in step S503, the determining, by the terminal device, the time-frequency resource for sending the HARQ-ACK codebook may specifically include:

First, the terminal device may determine a first resource set in a plurality of resource sets based on a quantity of bits of the feedback information included in the HARQ-ACK codebook, where the quantity of bits of the feedback information included in the HARQ-ACK codebook falls within a quantity-of-bits interval corresponding to the first resource set.

In this embodiment of this application, the network device may configure the plurality of resource sets for the terminal device by using higher layer signaling, and the resource sets may also be referred to as PUCCH resource sets. For example, the network device may send resource set configuration information to the terminal device, where the resource set configuration information indicates information about the plurality of resource sets configured by the network device.

Specifically, each resource set may include a plurality of PUCCH resources, and the PUCCH resource may be for carrying the HARQ-ACK codebook. Each resource set may further correspond to one quantity-of-bits interval, and quantity-of-bits intervals corresponding to different resource sets do not overlap each other. In this way, after determining the quantity of bits of the feedback information included in the to-be-sent HARQ-ACK codebook, the terminal device may determine a resource set corresponding to the quantity-of-bits interval within which the quantity of bits falls, and further determine a resource set that includes a PUCCH resource for sending the HARQ-ACK codebook.

It should be noted that a quantity of bits included in each piece of feedback information corresponding to the HARQ-ACK codebook is not limited in this embodiment of this application, and one piece of feedback information may include one or more bits.

Then, the terminal device may determine, in the first resource set based on the PRI indication information in the third DCI in the M pieces of DCI, the time-frequency resource for sending the HARQ-ACK codebook.

In this embodiment of this application, the PRI indication information indicates one PUCCH resource in the determined first resource set, and the PRI indication information may also be understood as an index of the PUCCH resource in the resource set.

The third DCI is a piece of DCI with a last time domain position in K pieces of DCI. If there are a plurality of pieces of DCI with the last time domain position in the K pieces of DCI, the third DCI may be a piece of DCI with a highest frequency domain position in the DCI with the last time domain position in the K pieces of DCI, where that the frequency domain position is the highest means that an identifier of a resource block (RB) in which the DCI is located is the largest or an identifier of a resource element (RE) in which the DCI is located is the largest; the third DCI may be a piece of DCI corresponding to a cell with a largest identifier in the DCI with the last time domain position in the K pieces of DCI; or the third DCI may be a piece of DCI, corresponding to a cell with a largest identifier and located in a CORESET group with a largest identifier, in the DCI with the last time domain position in the K pieces of DCI. Alternatively, the third DCI may be in another implementation. This is not limited in this application. In this application, the terms "identifier" and "index" may be interchanged.

The K pieces of DCI in this embodiment of this application are a proper subset of the M pieces of DCI, in other words, the K pieces of DCI are K of the M pieces of DCI. Alternatively, this may be understood as: The K pieces of DCI are a set including K pieces of DCI that satisfy a specified condition in the M pieces of DCI, where K is a positive integer less than M.

Specifically, the K pieces of DCI are for scheduling K pieces of data in the N pieces of data, and each of the K pieces of DCI is for scheduling one of the K pieces of data. In other words, the K pieces of DCI are respectively for scheduling different data in the K pieces of data. Therefore, K is a positive integer less than or equal to N.

Each piece of DCI in the K pieces of DCI is the first piece of DCI in DCI for scheduling data that is scheduled by using the piece of DCI. For specific descriptions of the first piece of DCI, refer to the foregoing descriptions of the first piece of DCI in the plurality of pieces of repeated DCI. Details are not described herein again.

For ease of description, the following provides descriptions by using an example in which the first piece of DCI is DCI with an earliest time domain position in the plurality of pieces of repeated DCL In other words, each piece of DCI in the K pieces of DCI is DCI with an earliest time domain position in DCI for scheduling data that is scheduled by using the piece of DCI, that is, the K pieces of DCI are all DCI transmitted for the first time.

For example, if an piece of DCI in the K pieces of DCI is for scheduling data #i in the K pieces of data, where i is a positive integer less than or equal to K, it may indicate that the piece of DCI is DCI with an earliest time domain position in DCI for scheduling the data #i, to be specific, the $i^{th}$ piece of DCI is the first piece of DCI sent by the network device and for scheduling the data #i.

In view of this, it can be learned, based on the fact that the K pieces of DCI are the proper subset of the M pieces of DCI, that at least one of the M pieces of DCI is not included in the K pieces of DCI. To be specific, at least one piece of DCI in the M pieces of DCI is not transmitted for the first time, but is a repetition of another piece of DCI whose time domain position is before a time domain position of the piece of DCI. The two pieces of DCI are for scheduling same data. In addition, the another piece of DCI may belong to the K pieces of DCI, or may not belong to the M pieces of DCI, for example, may be DCI sent by the network device to the terminal device other than the M pieces of DCI. However, feedback information for the data scheduled by using the other DCI and the feedback information for the data scheduled by using the M pieces of DCI are fed back not in one HARQ-ACK codebook.

For example, the M pieces of DCI may include one piece of fourth DCI, and the fourth DCI is not included in the K pieces of DCI. The fourth DCI may be a repetition of a piece of DCI in the K pieces of DCI, to be specific, the fourth DCI and a piece of DCI in the K pieces of DCI are for scheduling same data, but a time domain position of the fourth DCI is located after a time domain position of the piece of DCI in the K pieces of DCI that is for scheduling the same data.

Alternatively, the fourth DCI may be a repetition of fifth DCI. The fifth DCI is a piece of DCI received by the terminal device from the network device other than the M pieces of DCI. The fourth DCI and the fifth DCI are for scheduling same data, but a time domain position of the fourth DCI is after a time domain position of the fifth DCI.

Optionally, in this embodiment of this application, DCI for scheduling same data may have same PRI indication information. In other words, repeated DCI is for scheduling same data, and values of PRI fields in the repeated DCI are also the same. In this way, values of PRI fields in the first DCI and the second DCI in the foregoing example may be the same.

It may be understood that the time-frequency resource for sending the HARQ-ACK codebook by the terminal device may be centrally allocated by the network device. After determining the time-frequency resource for sending the HARQ-ACK codebook by the terminal device, the network device may send the resource indication information to the terminal device by using the third DCI, so that the terminal device determines, based on the resource indication information, the time-frequency resource for sending the HARQ-ACK codebook. In this way, the network device and the terminal device have a consistent understanding of the time-frequency resource for sending the HARQ-ACK codebook.

Step S504: The terminal device sends the HARQ-ACK codebook to the network device on the time-frequency resource, where the HARQ-ACK codebook includes the feedback information for each of the N pieces of data.

Step S505: The network device receives, on the time-frequency resource, the HARQ-ACK, codebook sent by the terminal device.

In step S504 and step S505, the terminal device may send the HARQ-ACK codebook to the network device on the determined time-frequency resource through the PUCCH. Correspondingly, the network device may receive, on the determined time-frequency resource, the HARQ-ACK codebook sent by the terminal device through the PUCCH.

It can be learned that in this embodiment of this application, considering that values of PRI fields in repeated DCI are the same, and a value of a PRI field in DCI transmitted for the first time may be dynamically and flexibly changed by the network device according to a scheduling policy, in this embodiment of this application, the time-frequency resource for sending the HARQ-ACK codebook is determined based on the indication in the PRI field in the third DCI with the last time domain position in the DCI transmitted for the first time in the M pieces of DCI. In this way, a size of the determined time-frequency resource can match the quantity of bits of the feedback information included in the HARQ-ACK codebook that needs to be sent, to avoid a resource waste or poor reliability of the feedback information. This improves accuracy and flexibility of indicating, by the network device, the resource for sending the HARQ-ACK codebook.

Figure 6:
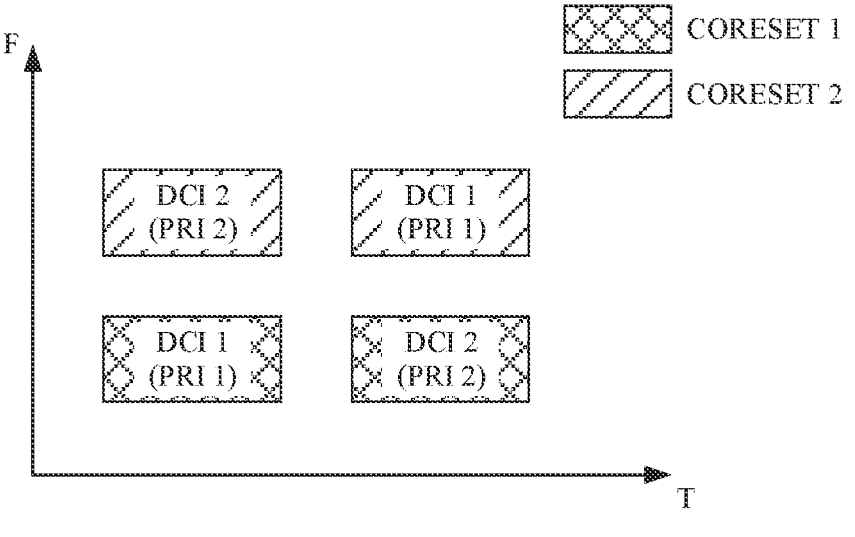
FIG. 6 shows a specific example of a feedback information sending method according to an embodiment of this application.
Figures 8, 9:
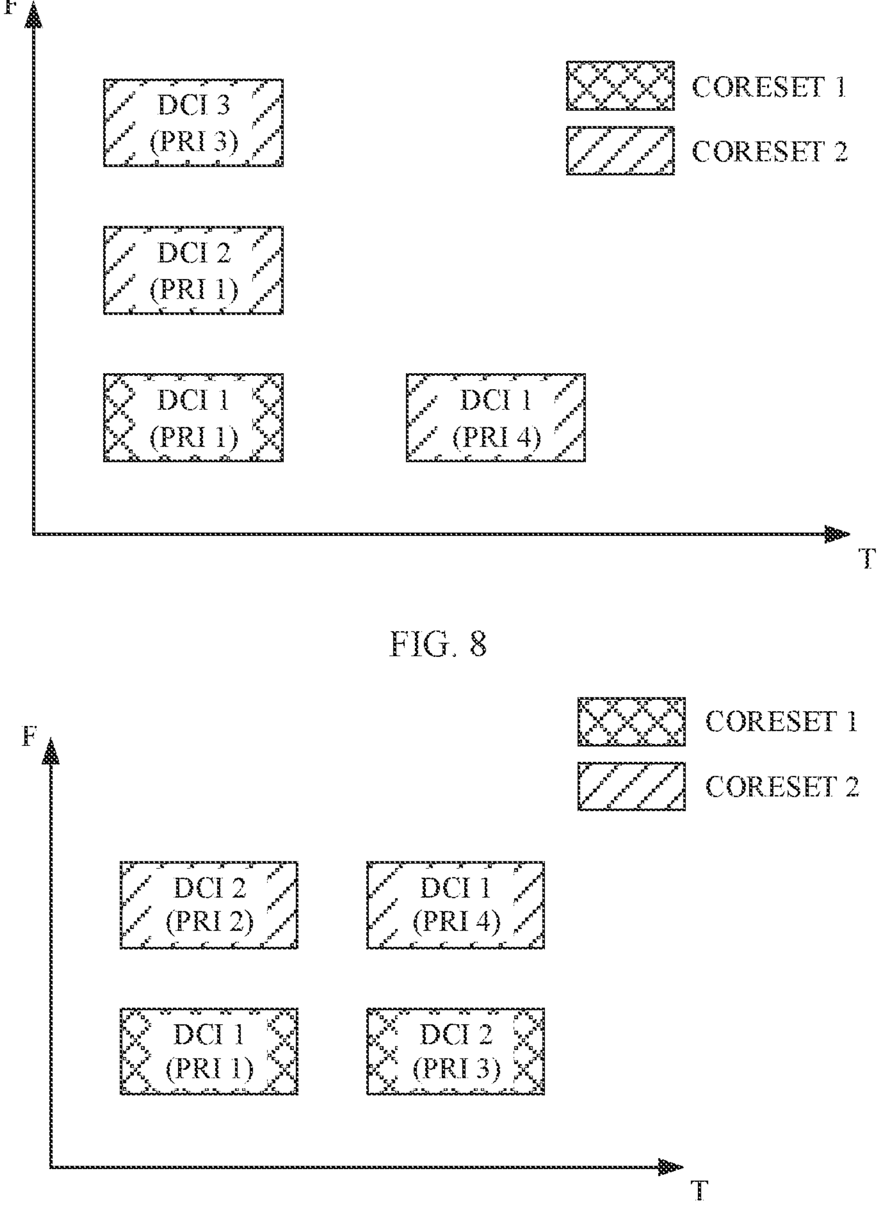
FIG. 8 shows a specific example of another feedback information sending method according to an embodiment of this application.
FIG. 9 shows another specific example of another feedback information sending method according to an embodiment of this application.

For example, in an example shown in FIG. 6, two pieces of DCI 1 are repeatedly sent, and both are for scheduling data 1. The first piece of DCI 1 is carried in a CORESET group 1, the second piece of DCI 1 is carried in a CORESET group 2, and PRI fields in the two pieces of DCI 1 are the same, and both indicate a PRI 1. Two pieces of DCI 2 are repeatedly sent, and both are for scheduling data 2. The first piece of DCI 2 is carried in the CORESET group 2, the second piece of DCI 2 is carried in the CORESET group 1, and PRI fields in the two pieces of DCI 2 are the same, and both indicate a PRI 2. It should be noted that in FIG. 6, a position of DCI closer to a vertical axis indicates an earlier time domain position, and a position of DCI farther from the vertical axis indicates a later time domain position. A higher position of DCI on the vertical axis indicates a higher frequency domain position, and a lower position of DCI on the vertical axis indicates a lower frequency domain position, Cases in FIG. 8 and FIG. 9 are similar to the case herein.

If feedback information corresponding to the two CORESET groups is separately fed back, and it is assumed that each piece of feedback information occupies one bit, for the CORESET group 1, the terminal device may generate a HARQ-ACK codebook based on the first piece of DCI 1 and the second piece of DCI 2, To be specific, the M pieces of DCI include the first piece of DCI 1 and the second piece of DCI 2, and the HARQ-ACK codebook includes one-bit feedback information for the data 1 and one-bit feedback information for the data 2. Further, the terminal device may determine a corresponding PUCCH resource set 1 based on the two-bit feedback information included in the HARQ-ACK codebook, and then determine, based on the PRI 1 indicated by the PRI field in the first piece of DCI 1, to send the HARQ-ACK codebook on a PUCCH resource 1 in the PUCCH resource set 1.

In this scenario, in the DCI for generating the HARQ-ACK codebook, the first piece of DCI 1 is the first piece of DCI for scheduling the data 1, namely, DCI with an earliest time domain position in DCI for scheduling the data 1, and is DCI transmitted for the first time the second piece of DCI 2 is not the first piece of DCI for scheduling the data 2, to be specific, is not DCI with an earliest time domain position in DCI for scheduling the data 2, and the second piece of DCI 2 is actually a repetition of the first piece of DCI 2 with an earlier time domain position instead of DCI transmitted for the first time. Therefore, the K pieces of DCI include only the first piece of DCI 1, and the DCI with the last time domain position in the K pieces of DCI is the first piece of DCI 1.

For the CORESET group 2, the terminal device may generate a HARQ-ACK codebook based on the second piece of DCI 1 and the first piece of DCI 2. To be specific, the M pieces of DCI include the second piece of DCI 1 and the first piece of DCI 2, and the HARQ-ACK codebook includes one-bit feedback information for the data 1 and one-bit feedback information for the data 2. Further, the terminal device may determine the corresponding PUCCH resource set 1 based on the two-bit feedback information included in the HARQ-ACK codebook, and then determine, based on the PRI 2 indicated by the PRI field in the first piece of DCI 2, to send the HARQ-ACK codebook on a PUCCH resource 2 in the PUCCH resource set 1.

Similarly in this scenario, the K pieces of DCI include only the first piece of DCI 2, and the DCI with the last time domain position in the K pieces of DCI is the first piece of DCI 2.

If feedback information corresponding to the two CORESET groups is jointly fed back, and it is assumed that each piece of feedback information occupies one bit, the terminal device may generate a joint HARQ-ACK codebook based on the first piece of DCI 1, the second piece of DCI 1, the first piece of DCI 2, and the second piece of DCI 2. To be specific, the M pieces of DCI include the first piece of DCI 1, the second piece of DCI 1, the first piece of DCI 2, and the second piece of DCI 2, and the HARQ-ACK codebook includes two-bit feedback information for the data 1 and two-bit feedback information for the data. 2. Further, the terminal device may determine a corresponding PUCCH resource set 2 based on the four-bit feedback information included in the HARQ-ACK codebook, and then determine, based on the PRI 2 indicated by the PRI field in the first piece of DCI 2, to send the HARQ-ACK codebook on a PUCCH resource 1 in the PUCCH resource set 2.

In this scenario, the K pieces of DCI include the first piece of DCI 1 and the first piece of DCI 2. Because a time domain position of the first piece of DCI 1 is the same as a time domain position of the first piece of DCI 2, the first piece of DCI 2 with a higher frequency domain position in the two pieces of DCI is selected, to determine the PUCCH resource for sending the HARQ-ACK codebook.

Embodiment 2

Figure 7:
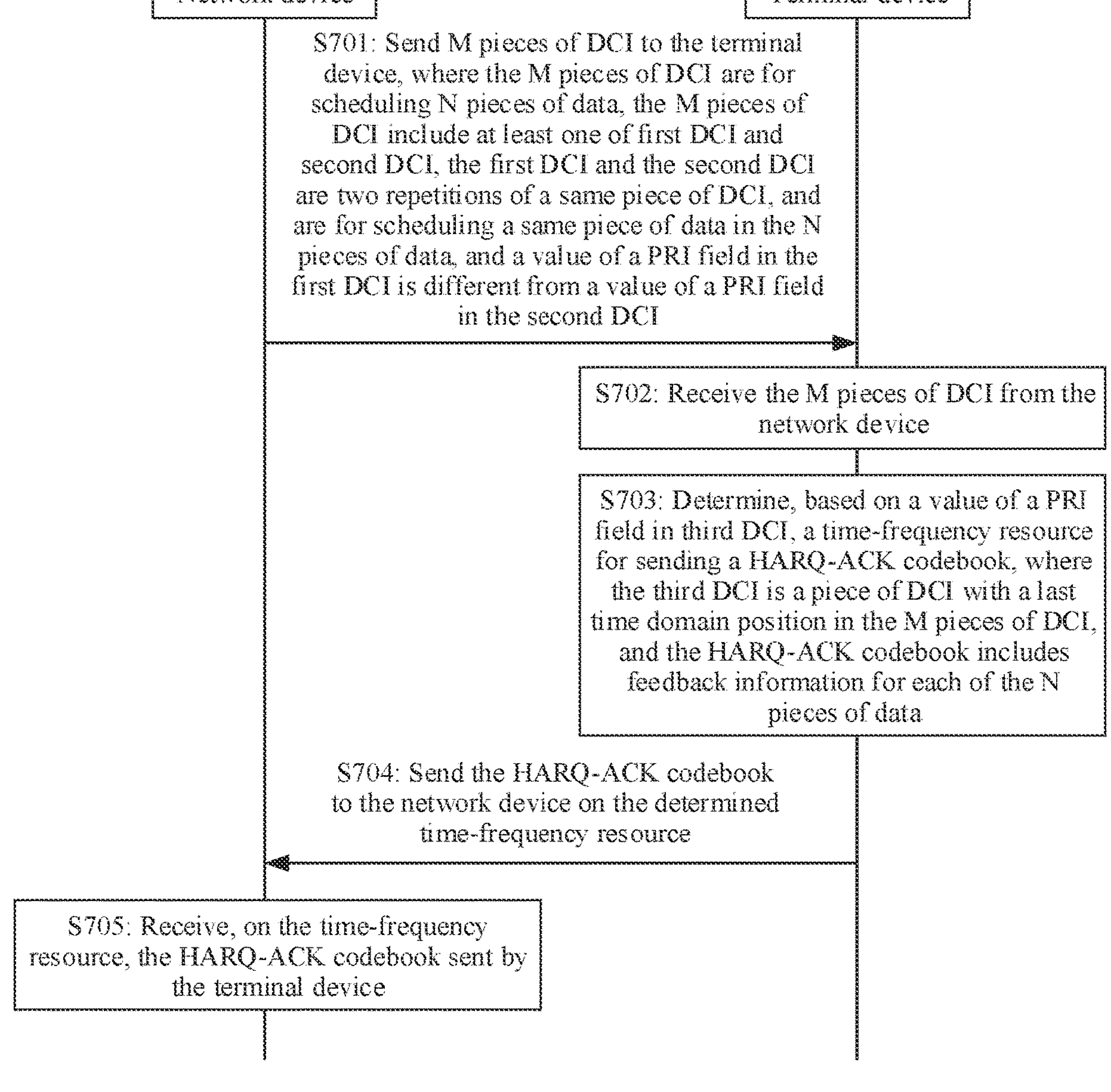
FIG. 7 is a schematic flowchart of another feedback information sending method according to an embodiment of this application.

FIG. 7 is a schematic diagram of another feedback information sending method according to an embodiment of this application. The method specifically includes the following steps.

Step S701: A network device sends M pieces of DCI to a terminal device, where the M pieces of DCI are for scheduling N pieces of data, M is an integer greater than or equal to 2, and N is an integer less than or equal to M and greater than or equal to 2.

In step S701, for a specific implementation of the M pieces of DCI and an implementation of sending, in a same HARQ-ACK codebook, feedback information for the data scheduled by using the M pieces of DCI, refer to the descriptions in step S501 in Embodiment 1. Details are not described herein again.

Similarly, Embodiment 2 may also be applied to a scenario with DCI repetition. The scenario may be: Two or more of the M pieces of DCI are repeated, or a piece of DCI in the M pieces of DCI is repeated with DCI sent by the network device other than the M pieces of DCI. This is not specifically limited. To be specific, at least one piece of DCI in the M pieces of DCI is not transmitted for the first time, but is a repetition of another piece of DCI whose time domain position is before a time domain position of the piece of DCI. The two pieces of DCI are for scheduling same data. In addition, the another piece of DCI may belong to the M pieces of DCI, or may not belong to the M pieces of DCI, for example, may be DCI sent by the network device to the terminal device other than the M pieces of DCI.

It may be understood that two or more pieces of repeated DCI are usually for scheduling same data, and include same information. However, it should be noted that in Embodiment 2 of this application, values of PRI fields in the two or more pieces of DCI for scheduling the same data may be different, but the two or more pieces of DCI may still be considered as repeated DCI.

For example, the M pieces of DCI may include at least one of first DCI and second DCI. The first DCI and the second DCI are two repetitions of a same piece of DCI, and are for scheduling same data. For example, both the first DCI and the second DCI may be for scheduling first data, and the first data is one of the N pieces of data. However, a value of a PRI field in the first DCI may be different from a value of a PRI field in the second. DCI. In other words, PRI indication information in the first DCI is different from PRI indication information in the second DCI.

Optionally, the network device may further send third indication information to the terminal device, where the third indication information indicates a value of M and/or a value of N. Alternatively, a value of M and/or a value of N in this embodiment of this application may be predefined.

Step S702: The terminal device receives the M pieces of DCI from the network device.

For a specific implementation of step S702, refer to step S701 and the descriptions of step S501 and step S502 in Embodiment 1. Details are not described herein again.

Step S703: The terminal device determines, based on a value of a PRI field in third DCI, a time-frequency resource for sending the HARQ-ACK codebook.

In this embodiment of this application, the third DCI is a piece of DCI with a last time domain position in the M pieces of DCI. A determining manner of the piece of DCI with the last time domain position in the M pieces of DCI herein is similar to a determining manner of the piece of DCI with the last time domain position in the K pieces of DCI in step S503. Specifically, if there are a plurality of pieces of DCI with the last time domain position in the M pieces of DCI, the third DCI may be a piece of DCI with a highest frequency domain position in the DCI with the last time domain position in the M pieces of DCI, where that the frequency domain position is the highest means that an identifier of an RB in which the DCI is located is the largest or an identifier of an RE in which the DCI is located is the largest; the third DCI may be a piece of DCI corresponding to a cell with a largest identifier in the DCI with the last time domain position in the M pieces of DCI; the third DCI may be a piece of DCI, corresponding to a cell with a largest identifier and located in a CORESET with a largest identifier, in the DCI with the last time domain position in the M pieces of DCI; or the third DCI may be a piece of DCI. corresponding to a cell with a largest identifier and located in a CORESET group with a largest identifier, in the DCI with the last time domain position in the M pieces of DCI.

In step S703, for a specific implementation of determining, based on the value of the PRI field in the third DCI, the time-frequency resource for sending the HARQ-ACK codebook, refer to the descriptions in step S503 in Embodiment 1. Details are not described herein again. However, it should be noted that the third DCI in Embodiment 2 of this application is different from the third DCI in Embodiment 1, The third DCI in Embodiment 2 is the DCI with the last time domain position in the M pieces of DCI, and the third DCI in Embodiment 1 is the DCI with the last time domain position in the K pieces of DCI. The K pieces of DCI are a proper subset of the M pieces of DCI, and the DCI with the last time domain position in the K pieces of DCI and the DCI with the last time domain position in the M pieces of DCI may be same DCI, or may be different DCI.

Optionally, the terminal device may further combine and decode remaining bit fields other than a PRI field in one or more pieces of DCI that are in the M pieces of DCI and that are for scheduling same data, to ensure reliability of a PDCCH.

Step S704: The terminal device sends the HARQ-ACK codebook to the network device on the time-frequency resource, where the HARQ-ACK codebook includes the feedback information for each of the N pieces of data.

Step S705: The network device receives, on the time-frequency resource, the HARQ-ACK codebook sent by the terminal device.

In step S704 and step S705, the terminal device may send the HARQ-ACK codebook to the network device on the determined time-frequency resource through the PUCCH. Correspondingly, the network device may receive, on the time-frequency resource, the HARQ-ACK codebook sent by the terminal device through the PUCCH.

It can be learned that, considering different indication manners of PRI fields in repeated DCI, the time-frequency resource for sending the HARQ-ACK codebook is determined based on different DCI in Embodiment 2 and Embodiment 1 of this application.

In Embodiment 2 of this application, values of the PRI fields in the repeated DCI may be different. Therefore, for one piece of DCI, regardless of whether the DCI is repeated DCI or DCI transmitted for the first time, a value of a PRI field in the DCI may be dynamically and flexibly changed by the network device according to a scheduling policy. In this way, the time-frequency resource for sending the HARQ-ACK codebook is determined based on the value of the PRI field in the DCI with the last time domain position in the M pieces of DCI, so that a size of the determined time-frequency resource can match a quantity of bits of the feedback information included in the HARQ-ACK codebook that needs to be sent, to avoid a resource waste or poor reliability of the feedback information. This improves accuracy and flexibility of indicating, by the network device, the resource for sending the HARQ-ACK codebook.

For example, in an example shown in FIG. 8, two pieces of DCI 1 are repeatedly sent, and both are for scheduling data 1. The first piece of DCI 1 is carried in a CORESET group 1, the second piece of DCI 1 is carried in a CORESET group 2, and values of PRI fields in the two pieces of DCI 1 are different. The PRI field in the first piece of DCII indicates a PRI 1, and the PRI field in the second piece of DCI 1 indicates a PRI 4. In addition, DCI 2 and DCI 3 are separately sent, where both the DCI 2 and the DCI 3 are carried in a CORESET group 2. The DCI 2 is for scheduling data 2, and a PRI field in the DCI 2 indicates the PRI 4; the DCI 3 is for scheduling data 3, and a PRI field in the DCI 3 indicates a PRI 3.

If feedback information corresponding to the two CORESET groups is separately fed back, and it is assumed that each piece of feedback information occupies one bit, for the CORESET group 1, the terminal device may generate a HARQ-ACK codebook based on the first piece of DCI 1, where the HARQ-ACK codebook includes one-bit feedback information for the data 1. Further, the terminal device may determine a corresponding PUCCH resource set 1 based on the one-bit feedback information included in the HARQ-ACK codebook, and then determine, based on the PRI 1 indicated by the PRI field in the first piece of DCI 1, to send the HARQ-ACK codebook on a PUCCH resource 1 in the PUCCH resource set 1.

In this scenario, the DCI with the last time domain position in the M pieces of DCI is the first piece of DCI 1.

For the CORESET group 2, the terminal device may generate a HARQ-ACK codebook based on the DCI 2, the DCI 3, and the second piece of DCI 1, where the HARQ-ACK codebook includes one-bit feedback information for the data 1, one-bit feedback information for the data 2, and one-bit feedback information for the data 3. Further, the terminal device may determine the corresponding PUCCH resource set 1 based on the three-bit feedback information included in the HARQ-ACK codebook, and then determine, based on the PRI 4 indicated by the PRI field in the second piece of DCI 1, to send the HARQ-ACK codebook on a PUCCH resource 4 in the PUCCH resource set 1.

In this scenario, e DCI with the last time domain position in the M pieces of DCI is the second piece of DCI 1.

For another example, in an example shown in FIG. 9, two pieces of DCI 1 are repeatedly sent, and both are for scheduling data 1. The first piece of DCI 1 is carried in a CORESET group 1, the second piece of DCI 1 is carried in a CORESET group 2, and values of PRI fields in the two pieces of DCI 1 are different. The PRI field in the first piece of DCI 1 indicates a PRI 1, and the PRI field in the second piece of DCI 1 indicates a PRI 4. Two pieces of DCI 2 are repeatedly sent, and both are for scheduling data 2, The first piece of DCI 2 is carried in the CORESET group 2, the second piece of DCI 2 is carried in the CORESET group 1, and values of PRI fields in the two pieces of DCI 2 are different. The PRI field in the first piece of DCI 2 indicates a PRI 2, and the PRI field in the second piece of DCI 2 indicates a PRI 3.

If feedback information corresponding to the two CORESET groups is jointly fed back, and it is assumed that each piece of feedback information occupies one bit, the terminal device may generate a joint HARQ-ACK codebook based on the first piece of DCI 1, the second piece of DCI 1, the first piece of DCI 2, and the second piece of DCI 2, where the HARQ-ACK codebook includes two-bit feedback information for the data 1 and two-bit feedback information for the data 2. Further, the terminal device may determine a corresponding PUCCH resource set 2 based on the four-bit feedback information included in the HARQ-ACK codebook, and then determine, based on the PRI 4 indicated by the PRI field in the second piece of DCI 1, to send the HARQ-ACK codebook on a PUCCH resource 4 in the PUCCH resource set 2.

In this scenario, a time domain position of the second piece of DCI 1 is the same as a time domain position of the second piece of DCI 2, and there are two pieces of DCI with the last time domain position in the M pieces of DCI. In this case, the second piece of DCI 1 with a higher frequency domain position in the two pieces of DCI may be selected, to determine the PUCCH resource for sending the HARQ-ACK codebook.

Figure 10:
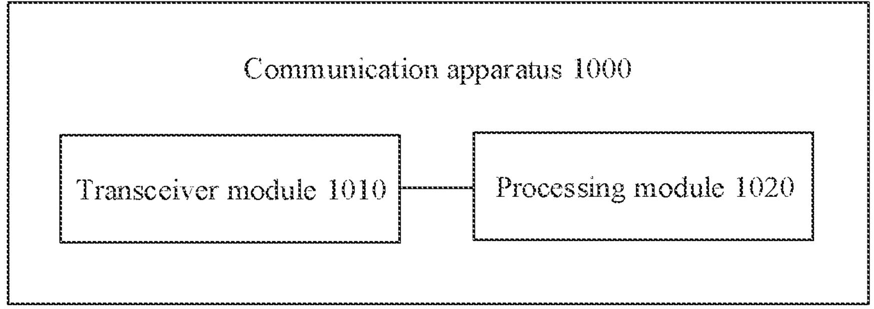
FIG. 10 is a schematic diagram of a structure of a communication apparatus according to an embodiment of this application.

An embodiment of this application further provides a communication apparatus. FIG. 10 is a schematic diagram of a structure of a communication apparatus 1000 according to an embodiment of this application, The communication apparatus 1000 includes a transceiver module 1010 and a processing module 1020. The communication apparatus may be configured to implement functions of the terminal device in any one of the foregoing method embodiments. For example, the communication apparatus may be a terminal device, may be a chip included in the terminal device, or may be an apparatus, for example, various types of vehicles, including the terminal device.

For example, when the communication apparatus serves as the terminal device and performs the method embodiment shown in FIG. 5, the transceiver module 1010 is configured to receive M pieces of DCI from a network device, where the M pieces of DCI are for scheduling N pieces of data, the M pieces of DCI include at least one of first DCI and second DCI. the first DCI and the second DCI are two repetitions of a same piece of DCI. and the first DCI and the second DCI are for scheduling a same piece of data in the N pieces of data, where M is an integer greater than or equal to 2, and N is an integer less than or equal to M and greater than or equal to 2. The processing module 1020 is configured to determine, based on resource indication information in third DCI, a time-frequency resource for sending a HARQ-ACK codebook, where the third DCI is a piece of DCI with a last time domain position in K pieces of DCI, the K pieces of DCI are a proper subset of the M pieces of DCI, and the HARQ-ACK codebook includes feedback information for each of the N pieces of data, where K is a positive integer. The transceiver module 1010 is further configured to send the HARQ-ACK codebook to the network device on the determined time-frequency resource.

In a possible design, the processing module 1020 is specifically configured to: determine a first resource set based on a quantity of bits of the feedback information included in the HARQ-ACK codebook, where the quantity of bits of the feedback information included in the HARQ-ACK codebook falls within a quantity-of-bits interval corresponding to the first resource set; and determine, in the first resource set based on the resource indication information in the third DCI, the time-frequency resource for sending the HARQ-ACK codebook. The resource indication information may be, for example, PRI indication information in a PRI field in the DCI.

In a possible design, the M pieces of DCI are carried in L CORESET groups, where L is an integer greater than or equal to 2. The transceiver module 1010 is further configured to receive first indication information from the network device, where the first indication information indicates to jointly feed back the feedback information corresponding to the L CORESET groups. In this scenario, the HARQ-ACK codebook is a HARQ-ACK codebook jointly fed back by using the L CORESET groups.

When the communication apparatus serves as the terminal device and performs the method embodiment shown in FIG. 7, the transceiver module 1010 is configured to receive M pieces of DCI from a network device, where the M pieces of DCI are for scheduling N pieces of data, the M pieces of DCI include at least one of first DCI and second DCI, the first DCI and the second DCI are two repetitions of a same piece of DCI, the first DCI and the second DCI are for scheduling a same piece of data in the N pieces of data, and a value of a PRI field in the first DCI is different from a value of a PRI field in the second DCI, where M is an integer greater than or equal to 2, and N is an integer less than or equal to M and greater than or equal to 2. The processing module 1020 is configured to determine, based on a value of a PRI field in third DCI, a time-frequency resource for sending a HARQ-ACK codebook, where the third DCI is a piece of DCI with a last time domain position in the M pieces of DCI. and the HARQ-ACK codebook includes feedback information for each of the N pieces of data. The transceiver module 1010 is further configured to send the HARQ-ACK codebook to the network device on the determined time-frequency resource.

In a possible design, the processing module 1020 is specifically configured to: determine a first resource set based on a quantity of bits of the feedback information included in the HARQ-ACK codebook, where the quantity of bits of the feedback information included in the HARQ-ACK codebook falls within a quantity-of-bits interval corresponding to the first resource set; and determine, in the first resource set based on the value of the PRI field in the third DCI, the time-frequency resource for sending the HARQ-ACK codebook.

In a possible design, the M pieces of DCI are carried in L CORESET groups, where L is an integer greater than or equal to 2. The transceiver module 1010 is further configured to receive first indication information from the network device, where the first indication information indicates to jointly feed back the feedback information corresponding to the L CORESET groups. In this scenario, the HARQ-ACK codebook is a HARQ-ACK codebook jointly fed back by using the L CORESET groups.

The processing module 1020 in the communication apparatus may be implemented by a processor or a processor-related circuit component, and the transceiver module 1010 may be implemented by a transceiver or a transceiver-related circuit component. Operations and/or functions of the modules in the communication apparatus are respectively for implementing the corresponding procedures of the method shown in FIG. 5 or FIG. 7. For brevity, details are not described herein again.

Figure 11:
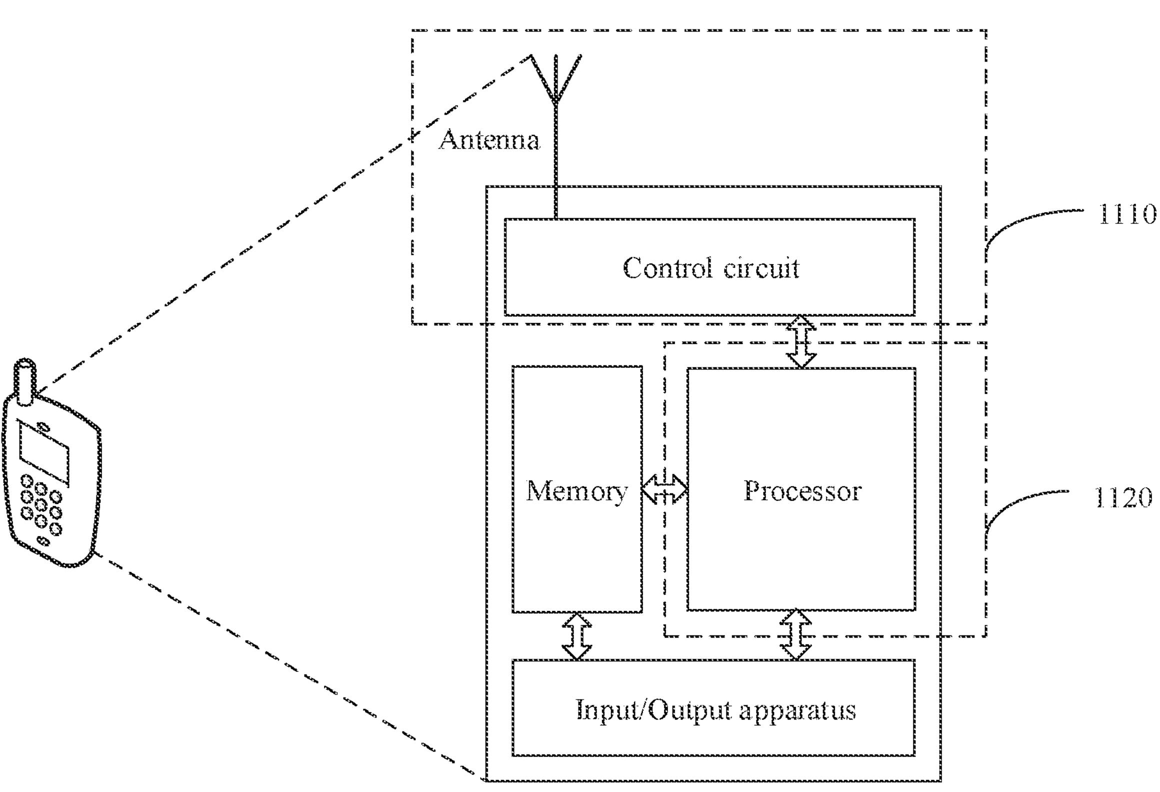
FIG. 11 is a schematic diagram of another structure of a communication apparatus according to an embodiment of this application.

FIG. 11 is a schematic diagram of another structure of a communication apparatus according to an embodiment of this application. The communication apparatus may be specifically a terminal device. For ease of understanding and illustration, in FIG. 11, a mobile phone is used as an example of the terminal device. As shown in FIG. 11, the terminal device includes a processor, may include a memory, and certainly, may further include a radio frequency circuit, an antenna, an input/output apparatus, and the like. The processor is mainly configured to: process a communication protocol and communication data, control the terminal device, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to send and receive the radio frequency signal in an electromagnetic wave form. The input/output apparatus, for example, a touchscreen, a display, or a keyboard, is mainly configured to: receive data input by a user, and output data to the user. It should be noted that some types of terminal devices may have no input/output apparatus.

When data needs to be sent, after performing baseband processing on the to-be-sent data, the processor outputs a baseband signal to the radio frequency circuit. The radio frequency circuit performs radio frequency processing on the baseband signal and then sends a radio frequency signal to the outside in the electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description. FIG. 11 shows only one memory and one processor. In an actual terminal device product, there may be one or more processors and one or more memories. The memory may also be referred to as a storage medium, a storage device, or the like. The memory may be configured independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 11, the terminal device includes a transceiver unit 1110 and a processing unit 1120. The transceiver unit may also be referred to as a transceiver, a transceiver apparatus, or the like. The processing unit may also be referred to as a processor, a processing board, a processing module, a processing apparatus, or the like. Optionally, a component that is in the transceiver unit 1110 and that is configured to implement the receiving function may be considered as a receiving unit, and a component that is in the transceiver unit 1110 and that is configured to implement the sending function may be considered as a sending unit. In other words, the transceiver unit 1110 includes the receiving unit and the sending unit. The transceiver unit may also be sometimes referred to as a transceiver circuit. The receiving unit may also be sometimes referred to as a receiver, a receive circuit, or the like. The sending unit may also be sometimes referred to as a transmitter, a transmit circuit, or the like. It should be understood that the transceiver unit 1110 is configured to perform a sending operation and a receiving operation on a terminal device side in the foregoing method embodiments, and the processing unit 1120 is configured to perform an operation other than the sending operation and the receiving operation of the terminal device in the foregoing method embodiments.

Figure 12:
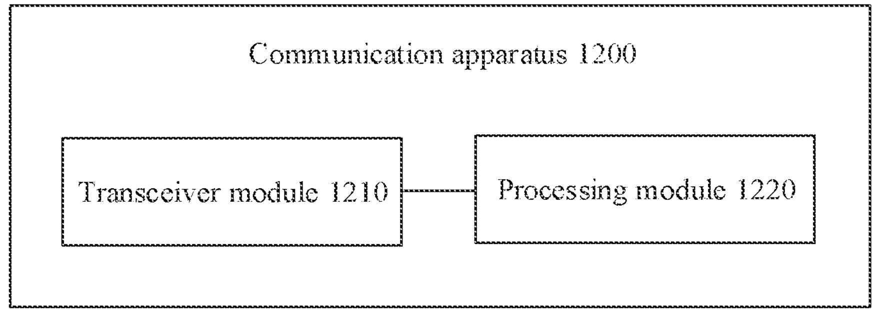
FIG. 12 is a schematic diagram of a structure of another communication apparatus according to an embodiment of this application.

An embodiment of this application further provides another communication apparatus. FIG. 12 is a schematic diagram of a structure of a communication apparatus 1200 according to an embodiment of this application. The communication apparatus 1200 includes a transceiver module 1210 and a processing module 1220. The communication apparatus may be configured to implement functions of the network device in any one of the foregoing method embodiments. For example, the communication apparatus may be a network device or a chip included in the network device.

For example, when the communication apparatus serves as the network device and performs the method embodiment shown in FIG. 5, the transceiver module 1210 is configured to send M pieces of downlink control information DCI to a terminal device, where the M pieces of DCI are for scheduling N pieces of data, the M pieces of DCI include at least one of first DCI and second DCI, the first DCI and the second DCI are two repetitions of a same piece of DCI, and the first DCI and the second DCI are for scheduling a same piece of data in the N pieces of data, where M is an integer greater than or equal to 2, and N is an integer less than or equal to M and greater than or equal to 2. The processing module 1220 is configured to determine, based on resource indication information in third DCI, a time-frequency resource for receiving a hybrid automatic repeat request-acknowledgement HARQ-ACK codebook, where the third DCI is a piece of DCI with a last time domain position in K pieces of DCI, the K pieces of DCI are a proper subset of the M pieces of DCI, and the HARQ-ACK codebook includes feedback information for each of the N pieces of data, where K is a positive integer. The transceiver module 1210 is further configured to receive the HARQ-ACK codebook from the terminal device on the determined time-frequency resource.

In a possible design, the M pieces of DCI are carried in L CORESET groups, where L is an integer greater than or equal to 2. The transceiver module 1210 is further configured to send first indication information to the terminal device, where the first indication information indicates to jointly feed back the feedback information corresponding to the L CORESET groups. In this scenario, the HARQ-ACK codebook is a HARQ-ACK codebook jointly fed back by using the L CORESET groups.

When the communication apparatus serves as the network device and performs the method embodiment shown in FIG. 7, the transceiver module 1210 is configured to send M pieces of DCI to a terminal device, where the M pieces of DCI are for scheduling N pieces of data, the M pieces of DCI include at least one of first DCI and second DCI, the first DCI and the second DCI are two repetitions of a same piece of DCI, the first DCI and the second DCI are for scheduling a same piece of data in the N pieces of data, and a value of a PRI field in the first DCI is different from a value of a PRI field in the second DCI, where M is an integer greater than or equal to 2, and N is an integer less than or equal to M and greater than or equal to 2. The processing module 1220 is configured to determine, based on a value of a PRI field in third DCI, a time-frequency resource for receiving a HARQ-ACK codebook, where the third DCI is a piece of DCI with a last time domain position in the M pieces of DCI, and the HARQ-ACK codebook includes feedback information for each of the N pieces of data. The transceiver module 1210 is further configured to receive the HARQ-ACK codebook from the terminal device on the determined time-frequency resource, In a possible design, the M pieces of DCI are carried in L CORESET groups, where L is an integer greater than or equal to 2. The transceiver module 1210 is further configured to send first indication information to the terminal device, where the first indication information indicates to jointly feed back the feedback information corresponding to the L CORESET groups. In this scenario, the HARQ-ACK codebook is a HARQ-ACK codebook jointly fed back by using the L CORESET groups.

It should be understood that the processing module 1220 in the communication apparatus may be implemented by a processor or a processor-related circuit component, and the transceiver module 1210 may be implemented by a transceiver or a transceiver-related circuit component. Operations and/or functions of the modules in the communication apparatus are respectively for implementing the corresponding procedures of the method shown in FIG. 5 or FIG. 7. For brevity, details are not described herein again.

Figure 13:
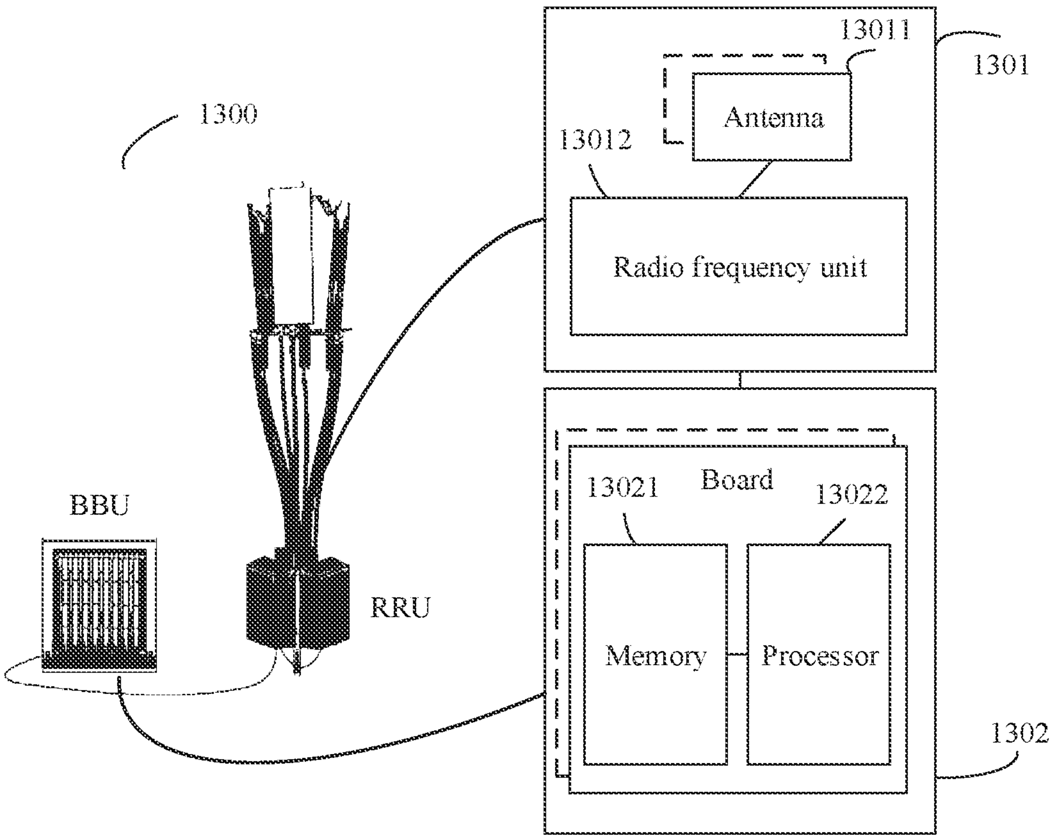
FIG. 13 is a schematic diagram of another structure of another communication apparatus according to an embodiment of this application.

FIG. 13 is a schematic diagram of another structure of a communication apparatus according to an embodiment of this application. The communication apparatus may be specifically a network device, for example, a base station, and is configured to implement functions of the network device in any one of the foregoing method embodiments.

The network device includes one or more radio frequency units such as a remote radio unit (RRU) 1301 and one or more baseband units (BBUs) (which may also be referred to as a digital unit (DU)) 1302. The RRU 1301 may be referred to as a transceiver unit, a transceiver, a transceiver circuit, or the like, and may include at least one antenna 13011 and a radio frequency unit 13012. The RRU 1301 is mainly configured to: send and receive a radio frequency signal, and perform conversion between the radio frequency signal and a baseband signal. The BBBU 1302 is mainly configured to: perform baseband processing, control the base station, and so on. The RRU 1301 and the BBU 1302 may be physically configured together, or may be physically configured separately, that is, in a distributed base station.

The BBU 1302 is a control center of the base station, may also be referred to as a processing unit, and is mainly configured to implement baseband processing functions such as channel coding, multiplexing, modulation, and spectrum spreading. For example, the BBU (the processing unit) 1302 may be configured to control the base station to perform an operation procedure related to the network device in the foregoing method embodiments, In an example, the BBU 1302 may include one or more boards. A plurality of boards may jointly support a radio access network (for example, an LTE network) of a single access standard, or may separately support radio access networks (such as an LTE network, a 5G network, or another network) of different access standards. The BBU 1302 may further include a memory 13021 and a processor 13022. The memory 13021 is configured to store necessary instructions and data. The processor 13022 is configured to control the base station to perform a necessary action, for example, is configured to control the base station to perform a sending operation in the foregoing method embodiments. The memory 13021 and the processor 13022 may serve one or more boards. In other words, a memory and a processor may be configured on each board. Alternatively, a plurality of boards may share a same memory and a same processor. In addition, a necessary circuit may be further configured on each board.

An embodiment of this application further provides a chip system, including a processor, where the processor is coupled to a memory. The memory is configured to store a program or instructions. When the program or the instructions is/are executed by the processor, the chip system is enabled to implement the method in any one of the foregoing method embodiments.

Optionally, there may be one or more processors in the chip system. The processor may be implemented by hardware, or may be implemented by software. When the processor is implemented by hardware, the processor may be a logic circuit, an integrated circuit, or the like, When the processor is implemented by software, the processor may be a general-purpose processor, and is implemented by reading software code stored in the memory.

Optionally, there may also be one or more memories in the chip system. The memory may be integrated with the processor, or may be separate from the processor. This is not limited in this application. For example, the memory may be a non-transitory memory, for example, a read-only memory ROM. The memory and the processor may be integrated into a same chip, or may be separately configured on different chips. A type of the memory and a manner of configuring the memory and the processor are not specifically limited in this application.

For example, the chip system may be a field programmable gate array (FPGA), an application-specific integrated circuit (ASIC), a system on a chip (SoC), a central processing unit (CPU), a network processor (NP), a digital signal processor (DSP), a microcontroller unit (MCU), a programmable logic device (PLD), or another integrated chip.

It should be understood that the steps in the foregoing method embodiments may be completed by using a logic circuit or instructions in a software form in the processor. The steps of the methods disclosed with reference to embodiments of this application may be directly performed by a hardware processor, or may be performed by a combination of hardware in the processor and a software module.

An embodiment of this application further provides a computer-readable storage medium. The computer storage medium stores computer-readable instructions. When a computer reads and executes the computer-readable instructions, the computer is enabled to perform the method in any one of the foregoing method embodiments.

An embodiment of this application further provides a computer program product. When a computer reads and executes the computer program product, the computer is enabled to perform the method in any one of the foregoing method embodiments.

An embodiment of this application further provides a communication system. The communication system includes a network device and at least one terminal device.

It should be understood that, the processor in embodiments of this application may be a CPU, or may be another general-purpose processor, a DSP, an ASIC, an FPGA or another programmable logic device, a discrete gate or a transistor logic device, a discrete hardware component, or the like. The general-purpose processor may be a microprocessor, or the processor may be any conventional processor or the like.

It should be further understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (the storage module) is integrated into the processor.

It should be noted that the memory described in this specification aims to include but is not limited to these memories and any memory of another proper type.

It should be understood that various numbers in various embodiments of this application are merely for differentiation for ease of description. Sequence numbers of the foregoing processes do not mean execution sequences. The execution sequences of the processes should be determined based on functions and internal logic of the processes, and should not be construed as any limitation on the implementation processes of embodiments of the present invention.

A person of ordinary skill in the art may be aware that, with reference to the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that this implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or other forms, The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a firm of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory, a random access memory, a magnetic disk, or an optical disc.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

What is claimed is:

1. An apparatus comprising:

at least one processor; and a memory coupled to the at least one processor and storing programing instructions executable by the at least one processor to perform operations comprising:

receiving, from a network device, M pieces of downlink control information (DCI) for scheduling transmissions of N pieces of data, the M pieces of DCI comprise first DCI and second DCI, the first DCI and the second DCI are two repetitions of a same piece of DCI, and the first DCI and the second DCI are for scheduling a same piece of data in the N pieces of data, wherein M is an integer greater than or equal to 2, and N is an integer less than M and greater than or equal to 2, wherein one piece of DCI or multiple pieces of repeated DCI are for scheduling each piece of data of the N pieces of data, wherein an ith piece of data in the N pieces of data is scheduled by multiple pieces of repeated DCI, and wherein an ith piece of DCI in the N pieces of DCI that corresponds to the ith piece of data is located in an earliest time domain position in the corresponding multiple pieces of repeated DCI for scheduling the ith piece of data, wherein i is a positive integer less than or equal to N;

determining, based on resource indication information in third DCI, a time-frequency resource for sending a hybrid automatic repeat request-acknowledgement (HARQ-ACK) codebook that comprises feedback information for N pieces of data corresponding to N pieces of DCI of the M pieces of DCI, wherein multiple pieces of DCI corresponding to multiple cells are located in a last time domain position in the N pieces of DCI, and wherein the third DCI is comprised in the multiple pieces of DCI and corresponds to a cell of the multiple cells with a largest cell identifier value;

determining a first resource set based on a quantity of bits of the feedback information comprised in the HARQ-ACK codebook, wherein the quantity of bits is a quantity inside of a quantity-of-bits interval corresponding to the first resource set, wherein the determining the time-frequency resource comprises determining the time-frequency resource in the first resource set based on the resource indication information in the third DCI; and sending the HARQ-ACK codebook to the network device on the time-frequency resource.

2. The apparatus according to claim 1, wherein the M pieces of DCI comprise fourth DCI other than the N pieces of DCI, wherein the fourth DCI is a repetition of one of the N pieces of DCI or a repetition of fifth DCI received from the network device other than the M pieces of DCI.

3. The apparatus according to claim 1, wherein the M pieces of DCI are carried in L control resource set (CORESET) groups, wherein L is an integer greater than or equal to 2, and wherein the operations comprising:

receiving first indication information from the network device, wherein the first indication information indicates to feed back the feedback information corresponding to the L CORESET groups.

4. The apparatus according to claim 1, wherein the M pieces of DCI are carried in a same CORESET group, and the HARQ-ACK codebook is a HARQ-ACK codebook corresponding to the CORESET group.

5. A feedback information sending method, comprising:

sending M pieces of downlink control information (DCI) for scheduling transmissions of N pieces of data, the M pieces of DCI comprise at least one of first DCI and second DCI, the first DCI and the second DCI are two repetitions of a same piece of DCI, and the first DCI and the second DCI are for scheduling a same piece of data in the N pieces of data, wherein M is an integer greater than or equal to 2, and N is an integer less than M and greater than or equal to 2, wherein one piece of DCI or multiple pieces of repeated DCI are for scheduling each piece of data of the N pieces of data, wherein an ith piece of data in the N pieces of data is scheduled by multiple pieces of repeated DCI, and wherein an ith piece of DCI in the N pieces of DCI that corresponds to the ith piece of data is located in an earliest time domain position in the corresponding multiple pieces of repeated DCI for scheduling the ith piece of data, wherein i is a positive integer less than or equal to N, and wherein the M pieces of DCI further comprise third DCI, resource indication information in the third DCI indicates a time-frequency resource for a hybrid automatic repeat request-acknowledgement (HARQ-ACK) codebook, the HARQ-ACK codebook comprises feedback information for N pieces of data corresponding to N pieces of DCI of the M pieces of DCI, wherein multiple pieces of DCI corresponding to multiple cells are located in a last time domain position in the N pieces of DCI, and wherein the third DCI is comprised in the multiple pieces of DCI and corresponds to a cell of the multiple cells with a largest cell identifier value, wherein the time-frequency resource is comprised in a first resource set and corresponds to the resource indication information in the third DCI, and wherein a quantity of bits is a quantity inside of a quantity-of-bits interval corresponding to the first resource set; and receiving the HARQ-ACK codebook on the time-frequency resource.

6. The method according to claim 5, wherein the M pieces of DCI comprise fourth DCI other than the N pieces of DCI, wherein the fourth DCI is a repetition of one of the N pieces of DCI or a repetition of fifth DCI sent by a network device other than the M pieces of DCI.

7. The method according to claim 5, wherein the M pieces of DCI are carried in L control resource set (CORESET) groups, wherein L is an integer greater than or equal to 2, and wherein the method further comprises:

sending first indication information to a terminal device, wherein the first indication information indicates to feed back the feedback information corresponding to the L CORESET groups.

8. The method according to claim 5, wherein the M pieces of DCI are carried in a same CORESET group, and the HARQ-ACK codebook is a HARQ-ACK codebook corresponding to the CORESET group.

9. An apparatus comprising:

at least one processor, and a memory coupled to the at least one processor and storing programing instructions executable by the at least one processor to perform operations comprising:

sending M pieces of downlink control information (DCI) for scheduling transmissions of N pieces of data, the M pieces of DCI comprise at least one of first DCI and second DCI, the first DCI and the second DCI are two repetitions of a same piece of DCI, and the first DCI and the second DCI are for scheduling a same piece of data in the N pieces of data, wherein M is an integer greater than or equal to 2, and N is an integer less than M and greater than or equal to 2, wherein one piece of DCI or multiple pieces of repeated DCI are for scheduling each piece of data of the N pieces of data, wherein an ith piece of data in the N pieces of data is scheduled by multiple pieces of repeated DCI, and wherein an ith piece of DCI in the N pieces of DCI that corresponds to the ith piece of data is located in an earliest time domain position in the corresponding multiple pieces of repeated DCI for scheduling the ith piece of data, wherein i is a positive integer less than or equal to N, and wherein the M pieces of DCI further comprise third DCI, resource indication information in the third DCI indicates a time-frequency resource for a hybrid automatic repeat request-acknowledgement (HARQ-ACK) codebook, the HARQ-ACK codebook comprises feedback information for N pieces of data corresponding to N pieces of DCI of the M pieces of DCI, wherein multiple pieces of DCI corresponding to multiple cells are located in a last time domain position in the N pieces of DCI, and wherein the third DCI is comprised in the multiple pieces of DCI and corresponds to a cell of the multiple cells with a largest cell identifier value, wherein the time-frequency resource is comprised in a first resource set and corresponds to the resource indication information in the third DCI, and wherein a quantity of bits is a quantity inside of a quantity-of-bits interval corresponding to the first resource set; and receiving the HARQ-ACK codebook on the time-frequency resource.

10. The apparatus according to claim 9, wherein the M pieces of DCI comprise fourth DCI other than the N pieces of DCI, wherein the fourth DCI is a repetition of one of the N pieces of DCI or a repetition of fifth DCI sent by a network device other than the M pieces of DCI.

11. The apparatus according to claim 9, wherein the M pieces of DCI are carried in L control resource set (CORESET) groups, wherein L is an integer greater than or equal to 2, and wherein the operations comprising sending first indication information to a terminal device, wherein the first indication information indicates to feed back the feedback information corresponding to the L CORESET groups.

* * * * *